(12) United States Patent
Nakashima et al.

(10) Patent No.: US 6,374,985 B1
(45) Date of Patent: Apr. 23, 2002

(54) CIRCULATING VIBRATORY LINEAR PARTS-FEEDER

(75) Inventors: Shinji Nakashima; Shuuichi Narukawa, both of Toyohashi (JP)

(73) Assignee: Shinko Electric Co., Ltd., Tokyo (JP)

( * ) Notice: Subject to any disclaimer, the term of this patent is extended or adjusted under 35 U.S.C. 154(b) by 0 days.

(21) Appl. No.: 09/643,115

(22) Filed: Aug. 21, 2000

(30) Foreign Application Priority Data

Aug. 25, 1999 (JP) .......................................... 11-238988

(51) Int. Cl.$^7$ .............................................. B65G 47/24
(52) U.S. Cl. ...................................... 198/391; 198/443
(58) Field of Search ................. 198/391, 771, 198/443

(56) References Cited

U.S. PATENT DOCUMENTS

| | | | | |
|---|---|---|---|---|
| 3,224,553 A | * | 12/1965 | Campbell | 198/771 |
| 4,175,654 A | * | 11/1979 | Lodge | 198/391 |
| 4,282,965 A | * | 8/1981 | Bates et al. | 198/391 |
| 4,434,887 A | * | 3/1984 | Yager | 198/391 |
| 4,844,240 A | * | 7/1989 | Hutter et al. | 198/771 |
| 5,103,962 A | * | 4/1992 | Voss et al. | 198/391 |

OTHER PUBLICATIONS

Japanese Publication No. 62–048607 —Published Feb. 28, 1987.

* cited by examiner

*Primary Examiner*—Joseph E. Valenza
(74) *Attorney, Agent, or Firm*—Carothers & Carothers

(57) ABSTRACT

In a circulating vibratory linear parts-feeder including: a main trough for transporting parts in one direction; and a return trough for transporting the parts in the opposite direction to the one direction, arranged closely to the main trough, and spaced with a small gap from the main trough, in which the parts are transferred from the downstream end of the return trough into the upstream end of the main trough. The parts are orientated in the main trough by orientating means and discharged from a discharge end to the outside and the other parts are returned from the downstream end of the main trough into the upstream end of the return trough. Thus the parts are being continuously circulated in the main trough and return trough. The main trough has a transport surface for orientating the parts, and an inward circulating surface which is lower than the transport surface. The return trough includes a circulating surface. The main trough and the return trough are vibrated by drives of different frequencies, respectively; and the parts are transferred from the downstream side of the return trough to the upstream end of the transport surface. The orientated parts are discharged from a discharge guide connected to the end of the main trough; and the parts being led into the inward circulating surface are transferred into the circulating surface of the return trough.

24 Claims, 22 Drawing Sheets

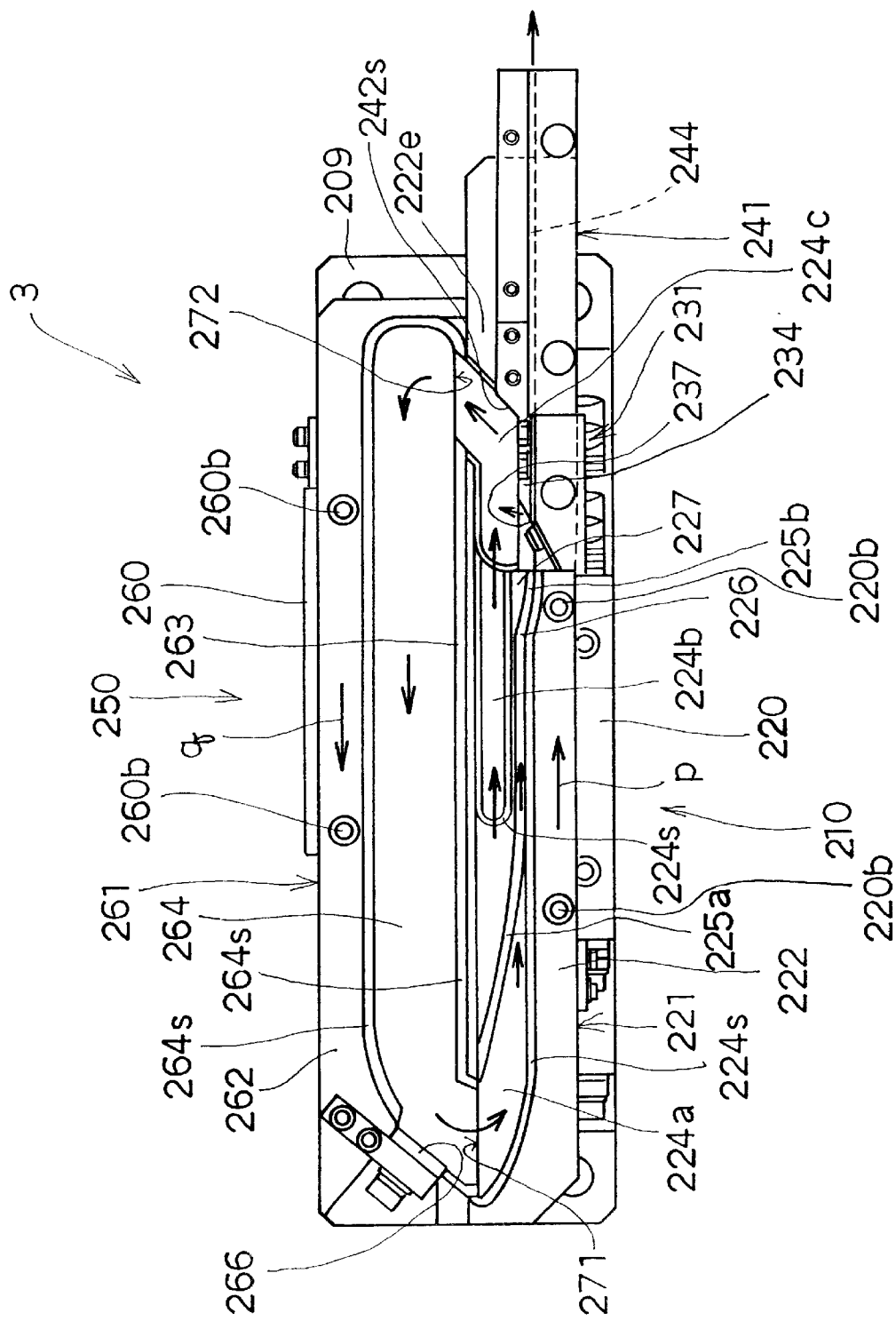

CIRCULATING VIBRATORY LINEAR PARTS-FEEDER

BACKGROUND OF THE INVENTION

1. Field of the Invention

This invention relates to a circulating vibratory linear parts-feeder and more particularly to a circulating vibratory linear parts-feeder which includes a main trough for transporting parts in one direction; and a return trough for transporting the parts in the opposite direction to the one direction, arranged closely to the main trough, spacing by a small gap from the main trough, and in which the parts are transferred from the downstream end of the return trough into the upstream end of the main trough. The parts are orientated in the main trough by orientating means are discharged from a discharge end to the outside and the other parts are returned from the downstream end of the main trough into the upstream end of the return trough. Thus the parts are being circulated through the main trough and return trough.

2. Description of the Prior Art

A vibratory parts-feeder of the bowl type is well known for supplying parts. A bowl is vibrated in a twisting motion. A linear parts-feeder is connected to the discharge end of the vibratory parts-feeder. The vibratory parts-feeder is highly expensive. The vibration modes of the vibratory parts-feeder and linear parts-feeder are different from each others at the connecting portion of the vibratory parts-feeder and linear parts-feeder. It is troublesome to combine the vibratory parts-feeder with the linear parts-feeder.

A linear parts-feeder is less expensive in which two linear troughs are arranged facing to each other and spaced with a little gap from each other. Parts are transported in opposite directions in the two troughs.

A circulating vibratory linear parts-feeder as shown in FIG. 1 and 2 is disclosed in the Japanese Patent Opening Gazette No. 175724/1998. The circulating vibratory linear parts-feeder 300 includes a main linear feeder 310 with a main trough 321 and a return linear feeder 350 with a return trough 361. A groove 323 for orientating is formed in the main trough 310. The parts are transported in the direction as shown by the arrow u, in the main trough 321, and in the direction as shown by the arrow v, in the return trough 361. A drive part 311 vibrates linearly the main trough 321. Another drive part 351 vibrates linearly the return trough 361. The main linear parts-feeder 310 and the return linear parts-feeder 350 are arranged on a common base.

Sidewalls 324 and 364 are integrally formed with transport surfaces 322 and 362. A guide 327 is made at the downstream end of the transport surface 322. The parts removed from the groove 323 are led to the return trough 361 by the guide 327. The parts transferred from the main trough 321 are transported in the return trough 361, along the arrow v. They are transferred from the downstream end of the return trough into the upstream end of the main trough. The parts led into the groove 323 are supplied to the next stage. The parts removed from the groove are circulated between the main trough and the return trough.

Japanese patent No. 1504417 of this patent assignee discloses a circulating vibratory linear parts-feeder wherein parts are transported in the opposite directions, in the first and second troughs. An orientating track and a lower track are formed in the second trough. The orientated parts are supplied from the orientating track to the outside. An upper track and a lower track are formed in the first trough, in parallel with each other. The first and second troughs are driven by the electromagnets which are connected to a common alternating current source. The amplitudes of the first and second troughs are independently controlled. The parts transported on the lower track of the first trough are led into the lower track of the second trough. The parts transported on the upper track of the first trough are led into the orientating track of the second trough. The parts rejected from the orientating track are fallen down on the lower track. The parts transported on the lower track are led into the upstream end of the first trough, and then distributed to the upper and lower tracks.

Generally, the natural frequencies of the main linear feeder and return linear feeder are so designed as to be near the drive frequency of the drive, so that the main and return troughs are effectively vibrated without interference from the vibration technique. However, the vibrations of the main and return troughs are apt to interfere with each other, and be unstable. Since they are vibrated near the resonant frequencies. The reason seems to be that the vibration of the main trough and return trough are transmitted through the leaf springs and the vibrating-absorbing systems to the mated return trough and main trough. If the amplitudes of the main trough and return trough are equal to each other and opposite in phase, the transmitting force is nearly equal to zero, since they are cancelled from each other. However, they are normally different from each other and so the difference is transmitted to the one trough from the other trough. Generally, a vibration system is unstable at its resonant frequency. Further, parts are apt to jam in the orientating groove, when the trough or the troughs contain too many parts.

SUMMARY OF THE INVENTION

It is an object of this invention to provide a circulating vibratory linear parts-feeder which can supply stably supply parts in the predetermined posture, to the next stage.

It is another object of this invention to provide a circulating vibratory linear parts-feeder which is widely applicable, and low cost.

In accordance with an aspect of this invention, in a circulating vibratory linear parts feeder includes: a main trough for transporting parts in one direction; and a return trough for transporting the parts in the opposite direction to the one opposition, arranged closely to the main trough, spaced a small gap from the main trough, wherein the parts are transferred from the downstream end of the return trough into the upstream end of the main trough: parts orientated in the main trough by orientating means are discharged from a discharge end to the outside and the other or remaining parts are returned from the downstream end of the main trough into the upstream end of the return trough. Thus the parts are being circulated in the main trough and return trough. The main trough comprises a transport surface for orientating the parts and an inward circulating surface which is lower than the transport surface; the return trough comprises a circulating surface and the main trough and the return trough are vibrated by drives of different frequencies, respectively. The parts are transferred from the downstream side of the return trough to the upstream end of the transport surface; the orientated parts are discharged from a discharge guide connected to the end of the main trough; and the parts being led into the inward circulating surface are transferred into the circulating surface of the return trough.

The foregoing other objects, features, and advantages of the present invention will be more readily understand upon consideration of the following detailed description of the preferred embodiments of the invention, taken in conjunction with the accompanying drawings.

BRIEF DESCRIPTION OF THE DRAWINGS

FIG. 4A shows the part in a desired posture, FIG. 4B and FIG. 4C show the part to be removed, respectively

FIG. 27 is a plan view of a circulating vibratory linear parts-feeder according to a third embodiment of this invention.

DESCRIPTION OF THE PREFERRED EMBODIMENTS

Figure 1:
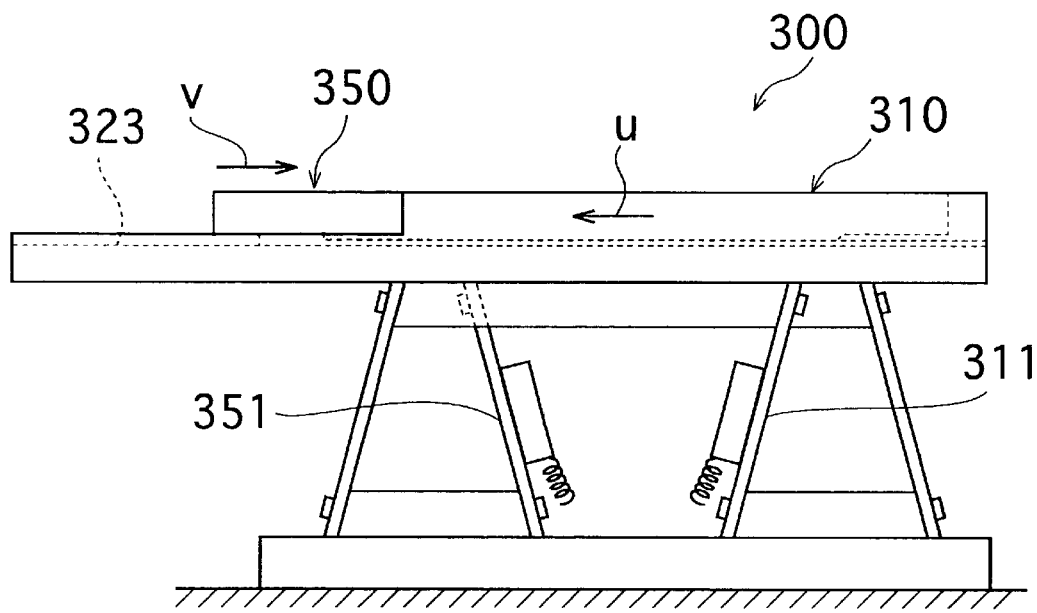
FIG. 1 is a side view of the prior art circulating vibratory linear parts-feeder.
Figure 2:
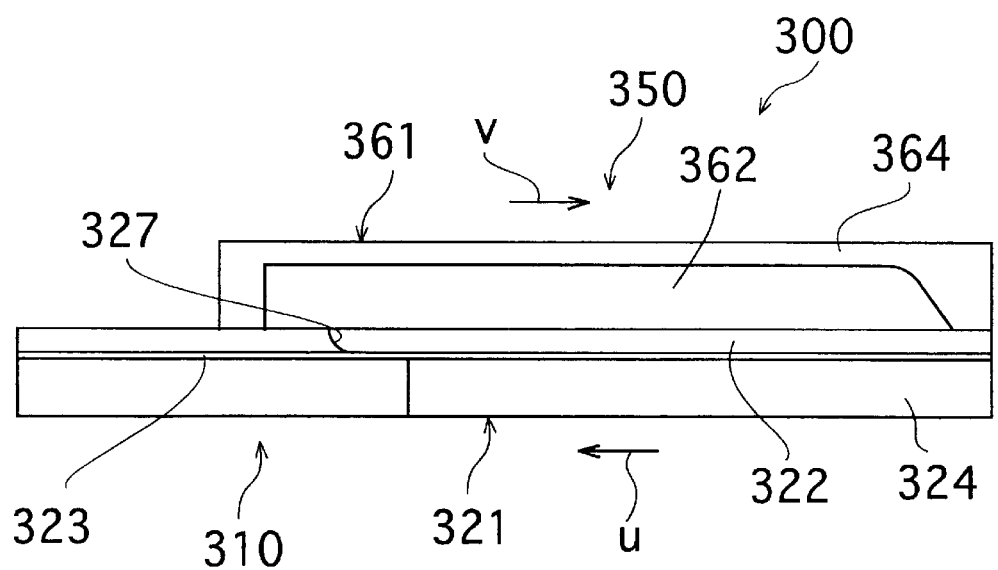
FIG. 2 is a plan view of the prior art circulating vibratory linear parts-feeder.
Figure 3:
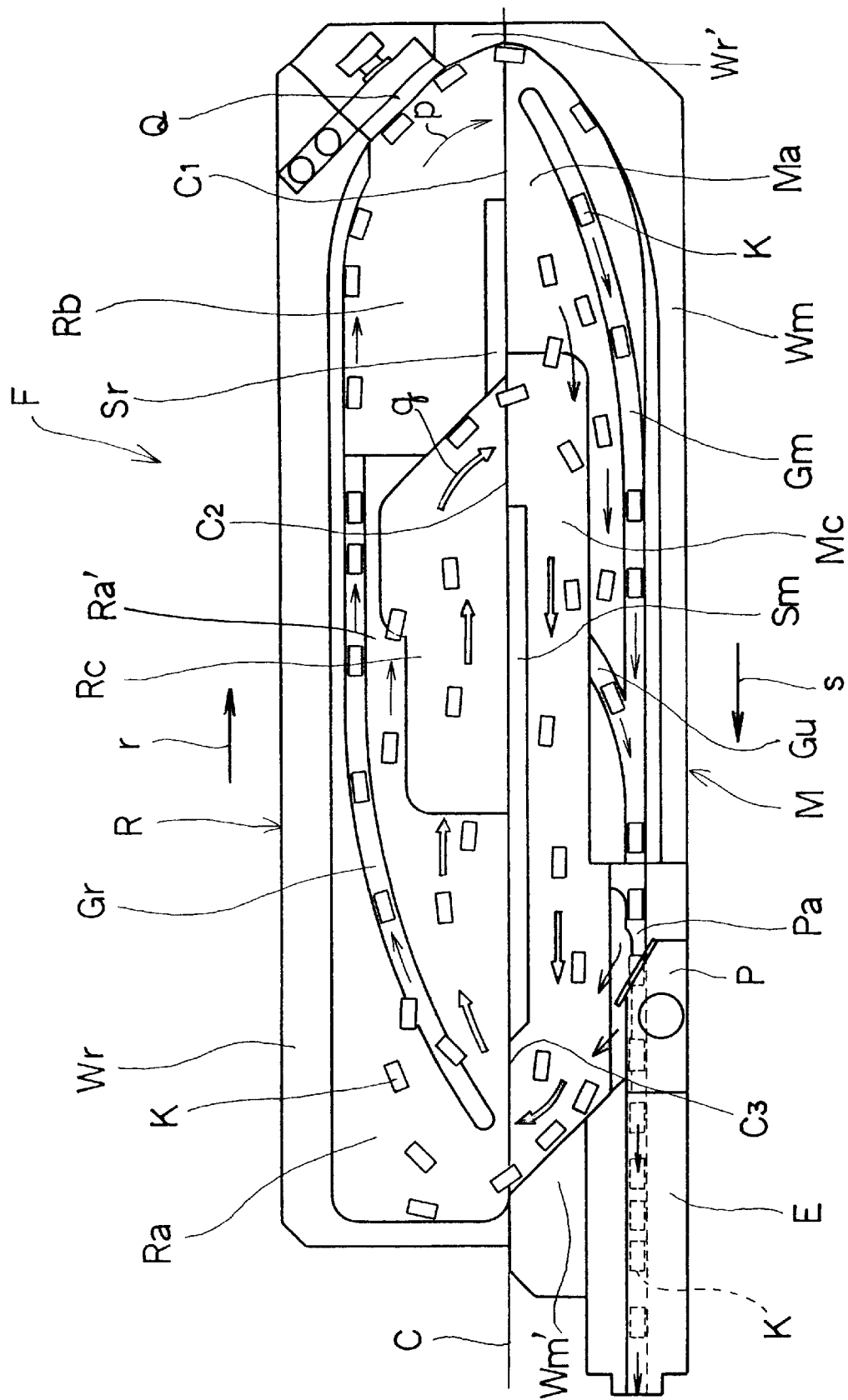
FIG. 3 is a plan view for schematically showing flow of parts in one example of a circulating vibratory linear parts-feeder of this invention.

First, a parts-flow principle of this invention will be described with reference to FIG. 3, which is a plan view of a circulating vibratory linear parts-feeder F.

A return trough R is an example somewhat complicated in construction, and it is facing to a main trough M, spaced with a little gap from each other. Parts K are transported along the arrow r in the return trough R vibrated linearly, and they are transported along the arrow s in the main trough M.

The return trough R includes a sidewall Wr, an emergency gate device Q, and an end sidewall Wr'. The main trough M includes a sidewall Wm, a single-row-layer forming device P, a discharge guide E, and an end sidewall Wm'. A separator $S_r$ and a separator Sm are integrally formed with edges of transport surfaces of the return and main troughs R and M, respectively, facing to each other, spacing a small gap on the line C. Transfer paths $C_1$, $C_2$, and $C_3$ are formed by the separators Sm and Sr, for transferring the parts between the main trough M and return trough R. The parts K cannot be transferred without passing the transfer paths $C_1$, $C_2$, and $C_3$. The return trough R has outward circulating surfaces Ra, Rb different in level, and an inward circulating surface Rc. The outward circulating surface Rb is lower somewhat than the outward circulating surface Ra. The inward circulating surface Rc is the lowest. A guide groove Gr is arcuately formed in the outward circulating surface Ra. The bottom of the guide groove Gr is slightly higher than the outward circulating surface Rb. The outward circulating surface Ra is two-stepwise narrowed by the inward circulating surface Rc, at the downstream side. And so the flow amount of the parts toward the downstream end is limited to a suitable amount. A transport surface Ma for orientating and an inward circulating surface Mc different in level are formed in the main trough M. The former is higher than latter. A guide groove Gm is arcuately formed in the transport surface Ma for orientating. The bottom of the guide groove Gm is slightly higher than the transport path Pa in the single-row-layer forming device P.

An auxiliary groove Gu is connected to the guide groove Gm in the downstream side of the transport surface Ma for orientating, for gathering the parts therein. At the transfer path $C_1$, the transport surface Ma is slightly lower than the outward circulating surface Rb. At the transfer path $C_2$, the inward circulating surface Mc of the main trough M is slightly lower than the inward circulating surface Rc of the return trough R. At the transfer path $C_3$, the outward circulating surface Ra of the return trough R is slightly lower than the inward circulating surface Mc of the main trough M.

The parts K are transported in two flows between the main trough M and the return trough R. In one of the two flows, the parts are transported through the outward circulating surface Ra→the guide groove Gr→the outward circulating surface Rb→the transfer path $C_1$→the transport surface Ma for orientating the guide groove Gm→the single-row-layer forming device P, as shown by the solid arrow p. In the other, the parts are transported through the inward circulating surface Rc→the transfer path $C_2$→the inward circulating transport surface Mc→the transfer path $C_3$→the outward circulating transport surface Ra→the inward circulating surface Rc→the transfer path $C_2$ →the inward circulating transport surface Mc as shown by the white arrow q.

Generally, natural frequency or resonant frequency of a vibratory feeder is so designed as to be near the drive frequency. When the main linear feeder and the return linear feeder are driven by the drive of the same frequency, the vibrations of the main linear feeder and return linear feeder are apt to interfere with each other. According to this invention, they are driven by the drives of different frequencies, respectively.

Preferably, the main trough M is vibrated by a drive of high frequency, while the return trough is vibrated by another drive of low frequency. The parts can be orientated with high accuracy by the vibration of high frequency. The main trough M is vibrated at the high frequency such as 200 to 300 Hz, by an alternating current source of high frequency. The return trough R is vibrated at the low frequency such as 100 to 120 Hz, by an alternating current source of low frequency. The low frequency may be obtained by full-wave rectification of the commercial supplying source (50 Hz or 60 Hz). The parts K are transported in the guide groove Gm and supplied at a predetermined rate through a discharge guide E to the next stage.

An amount of parts to compensate the supplied amount is transferred from the outward circulating surface Rb of the return trough R into the transport surface Ma of the main trough M. The parts K are circulated between the main trough M and the return trough R. The amplitudes of the main trough M and return trough R are so controlled that such a supply of the parts to the next stage and such compensation of parts can be obtained.

Next, there will be described a circulating vibratory linear parts-feeder according to a first embodiment of this invention with reference to the drawings.

Figure 4:
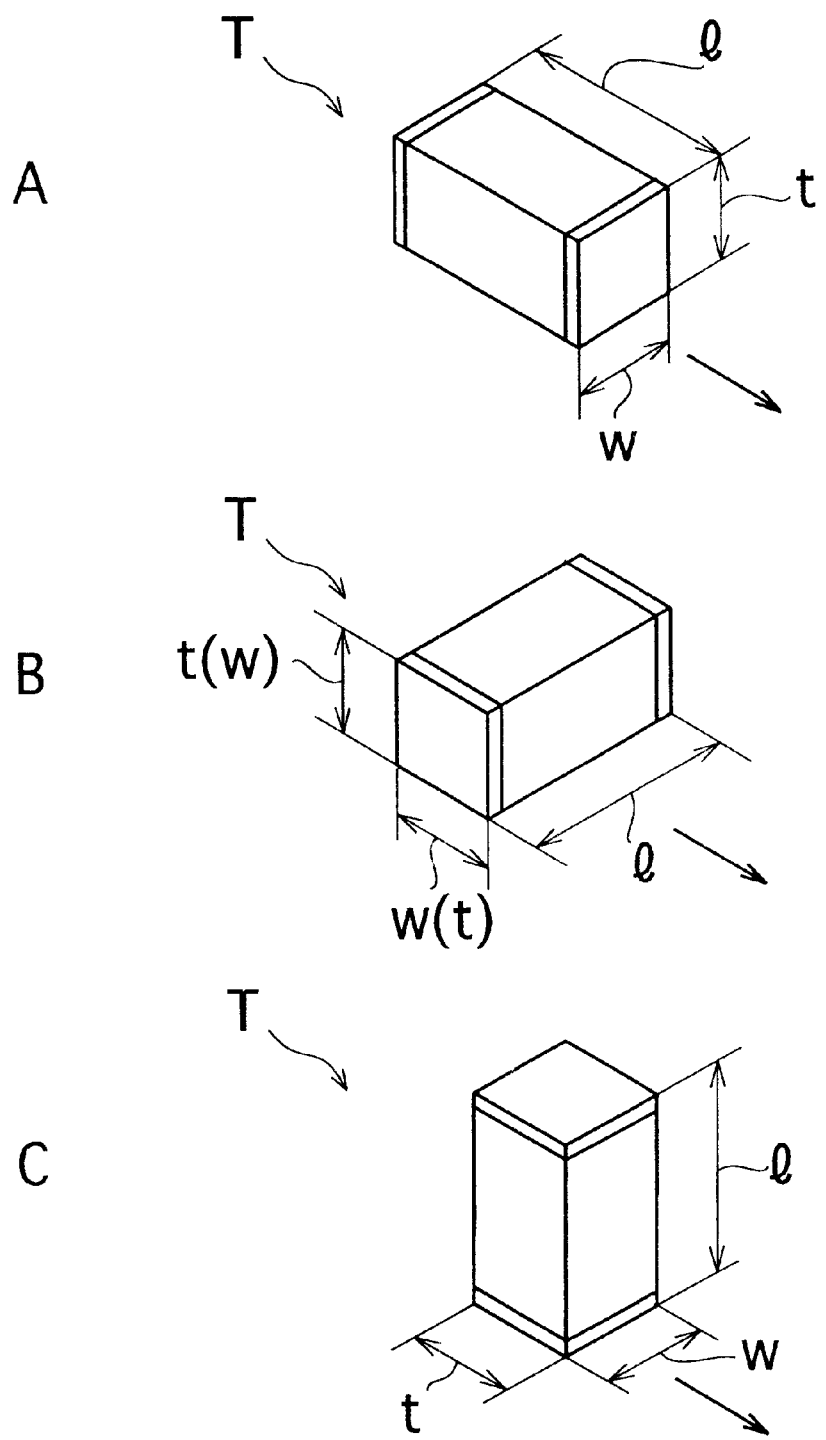
FIG. 4 is a perspective view of a part to be orientated in the embodiment of this invention.

FIG. 4 shows a part T which will be applied to the embodiments. It is a tip capacitor as an electronic part and rectangular. The length l, width w, and thickness t thereof are equal to 0.6 mm, 0.3 mm, and 0.3 mm, respectively. Thus, it is very small.

As shown in FIG. 4A, it is requested to be transported in the direction shown by the arrow and the shown posture. The parts T in the postures shown in FIG. 4B and FIG. 4C are removed from the track.

Figure 5:
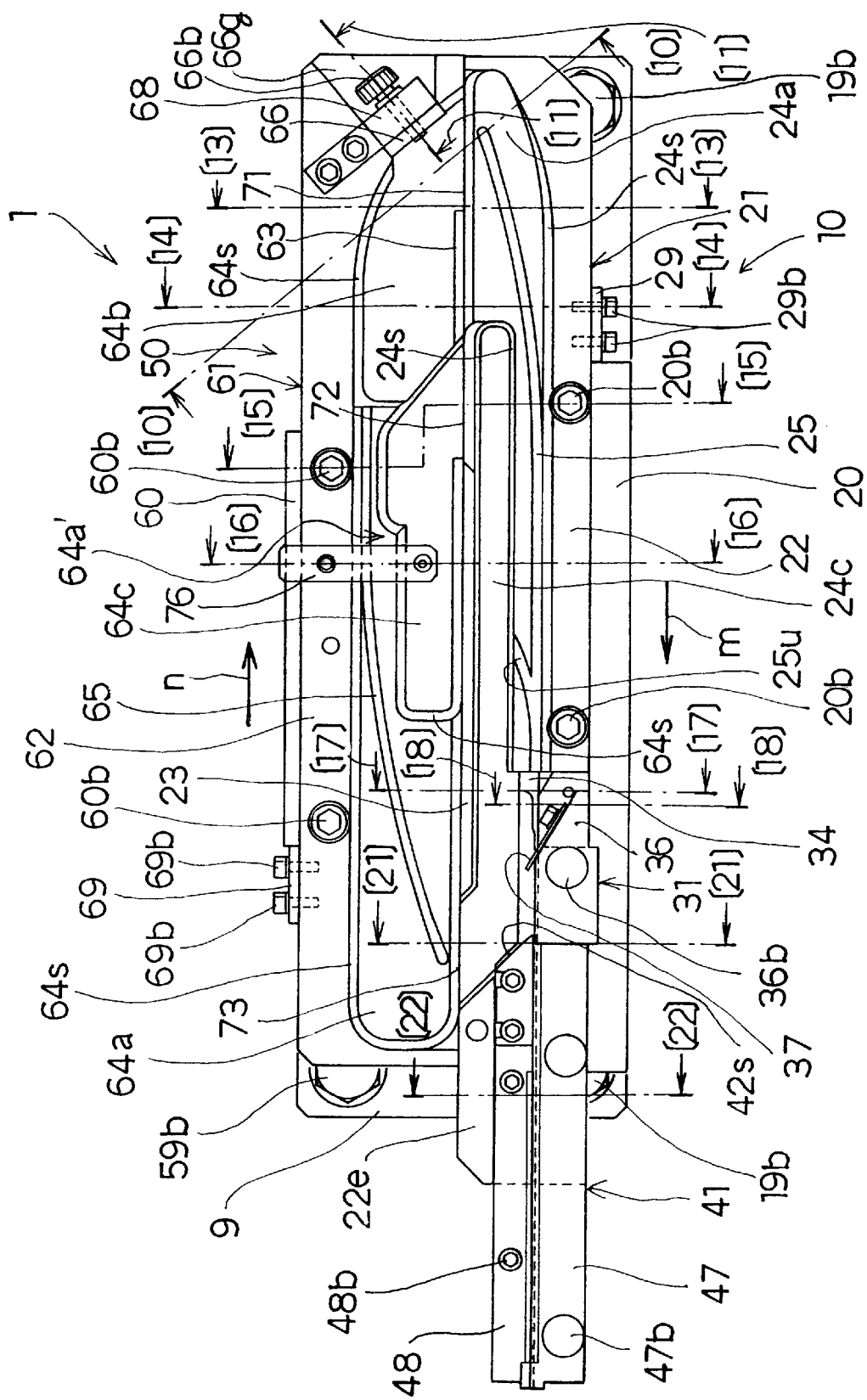
FIG. 5 is a plan view of a circulating vibratory linear parts-feeder of a first embodiment of this invention

FIG. 5 is a plan view of a circulating vibratory linear parts-feeder 1, which supplies the parts T to the next stage one by one in the posture shown by FIG. 4A.

Figure 6:
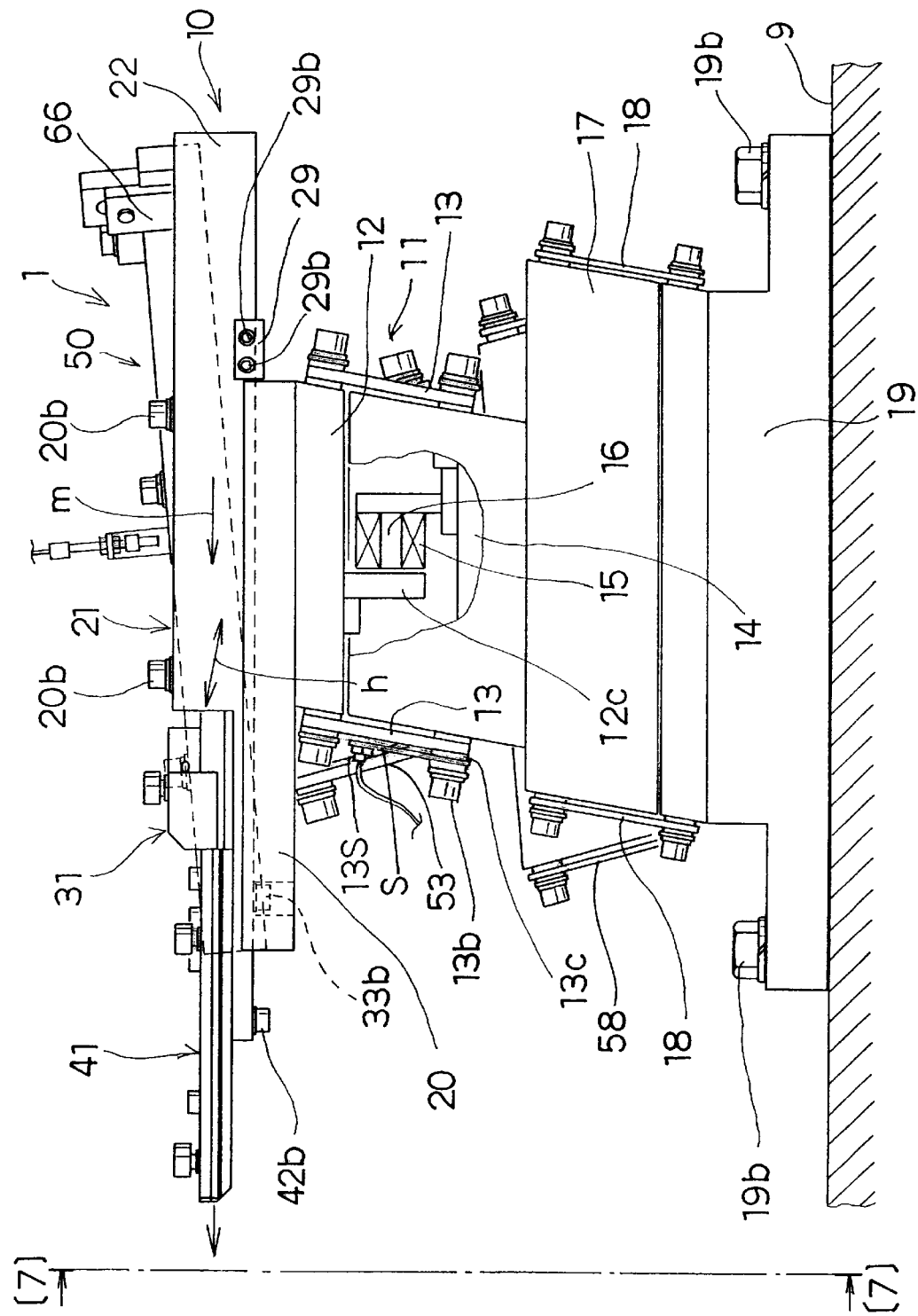
FIG. 6 is a partly broken-away side view of the first embodiment
Figure 7:
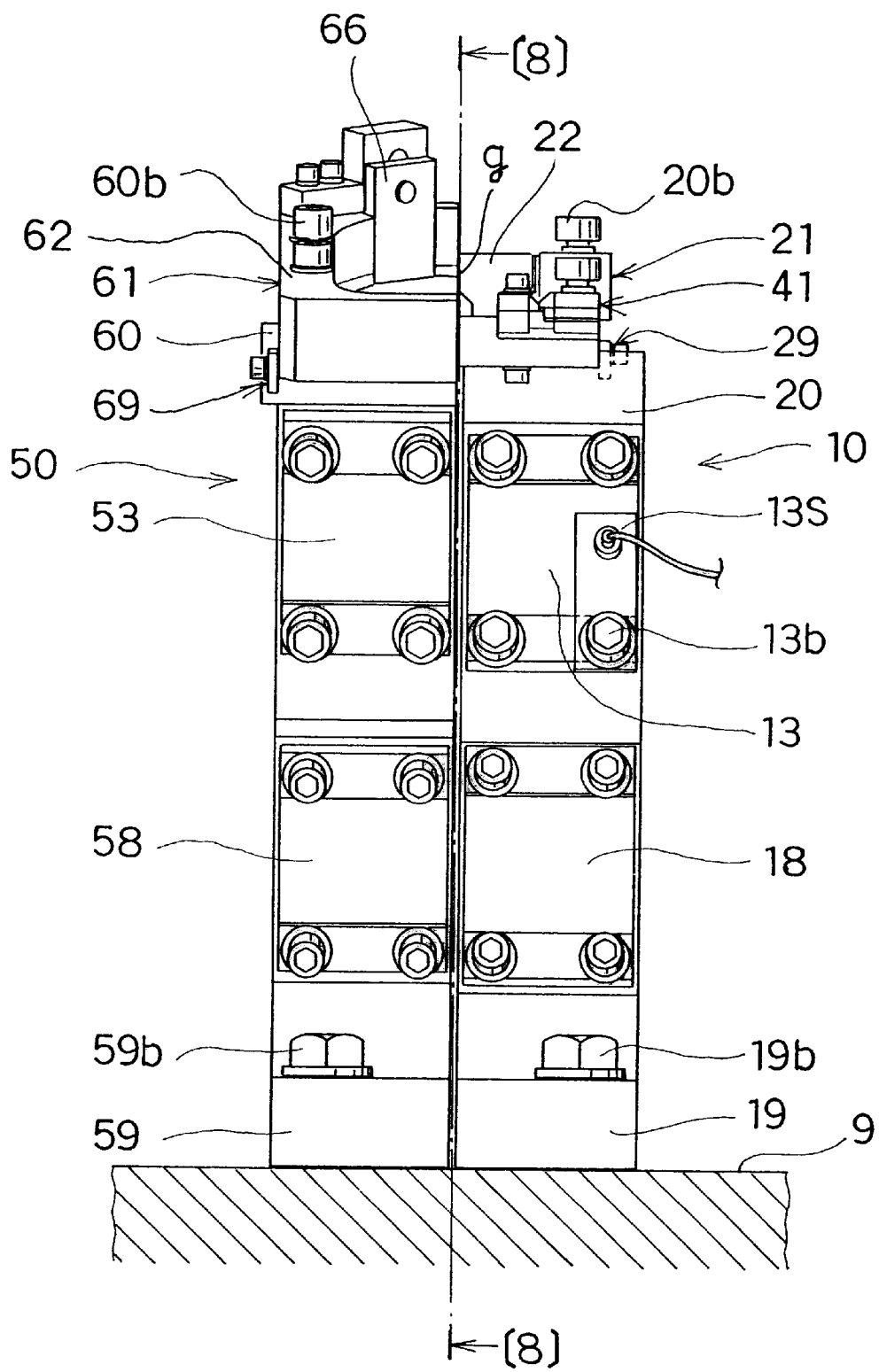
FIG. 7 is a front view taken along a line [7]—[7] in FIG. 6.
Figure 8:
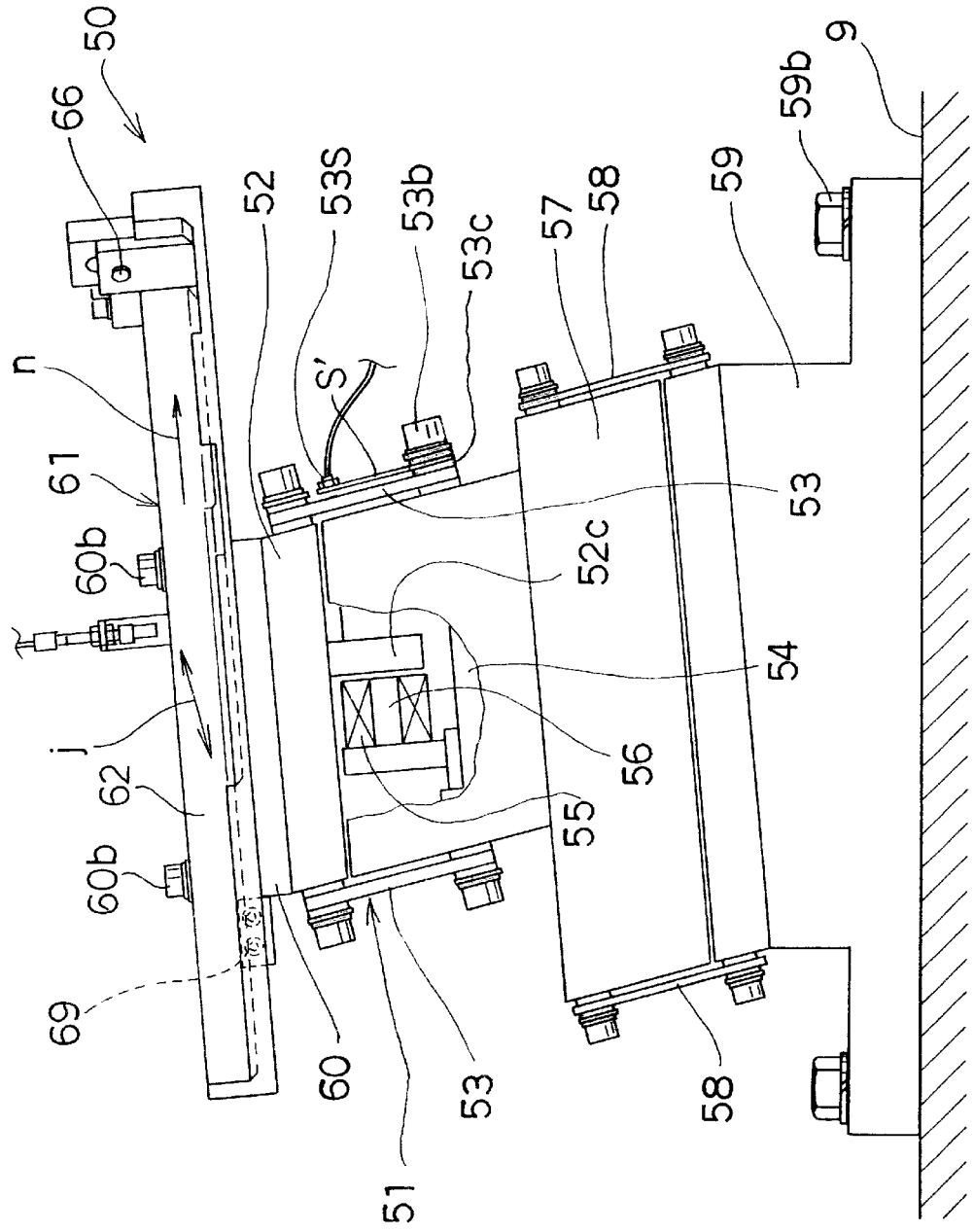
FIG. 8 is a partly broken-away side view taken along the line [8]—[8] in FIG. 7.

FIG. 6 is a partially-broken-away side view thereof, FIG. 7 is a front view taken along the line [7]—[7] in FIG. 6. FIG. 8 is a partially-broken side view taken along the line [8]—[8] in FIG. 7.

As shown in FIGS. 5, 6, and 7, a main trough 21 of a main linear feeder 10 and a return trough 61 of a return linear feeder 50 are arranged closely to each other, spacing a very small gap a, in the circulating vibratory linear parts-feeder 1. As shown in FIG. 6, the part T is transported in the main trough 21 along the arrow m. The main trough 21 is linearly vibrated along the arrow h by a drive part 1. The main linear feeder 10 consists of the main trough 21 and the drive part 11.

The return linear feeder 50 is upwardly inclined at the angle of 5°, with respect to the transporting direction, as shown in FIG. 6 and FIG. 8. The part T is transported in the return trough 61 along the arrow n. The return trough 61 is linearly vibrated by a drive part 51. Thus, the return linear feeder 50 consists of the return trough 61 and the drive part 51. The main linear feeder 10 and the return linear feeder 50 are arranged on a common base 9. The main trough 21 and the return trough 61 are perspectively shown in FIG. 9.

As shown in FIG. 5 and FIG. 6, a stopper plate 29 is fixed to a sidewall 22 of the main trough 21 by bolts 29b for positioning the latter relatively to a base block 20. The base block 20 is linearly vibrated by the drive part 11. When the main trough 21 is exchanged, the bolts 20b are loosened and the stopper plate 29 is demounted. In the drive part 11, a movable block 12 fixed to the base block 20 is combined with a stationary block 14 by a pair of leaf springs 13 which are slantly arranged in contact with the front and rear ends of the movable block 12 and the stationary block 14.

An electro-magnet 16 with a coil 15 is fixed to the stationary block 14, and it is facing to a movable core 12c extending downwards from the movable core 12 and spaced with a small gap.

In FIG. 6, a mounting plate S is fixed to the left leaf spring 13 at the lower end by a bolt 13b. A spacer 13c is interposed between the left leaf spring 13 and the mounting plate S. An amplitude sensor 13S of the eddy-current type is mounted on the upper end portion of the mounting plate S which is close to the left leaf spring 13, and it detects the amplitude of the leaf spring 13, namely the main trough 21. A not-shown control part is connected to the amplitude sensor 13S, and it is, in turn, connected to the coil 15 of the electro-magnet 16. The current flowing through the coil 15 is so controlled as to put the amplitude of the leaf spring 13 or the main trough 21 into a predetermined amplitude.

A vibration-absorbing block 17 is fixed to the stationary block 14 which is combined with a fixing block 19 by a pair of slant leaf springs 18. The vibration-absorbing block 17 and the leaf springs 18 constitute a vibration system of low resonant frequency for absorbing the vibration of the circulating linear parts-feeder 1 to the common base 9. The fixing block 19 is fixed to the common base 9 by bolts 19b. The not-shown control part includes an inverter which is connected to the coil 15 of the electro-magnet 16. An alternating current of about 300 Hz is flowed through the coil 15. An alternating magnetic force occurs between the movable core 12c and the electromagnet 16. The main trough 21 is linearly vibrated in the direction shown by the arrow h. The parts T are transported in the main trough 21 along the arrow m.

As shown in FIG. 5 and FIG. 8, a stopper plate 69 is fixed to a sidewall 62 of the return trough 61 by bolts 69b for positioning the latter relatively to a base block 60. The base block 60 is linearly vibrated by the drive part 51. When the return trough 61 is exchanged, the bolts 60b are loosened and the stopper plate 69 is demounted. In the drive part 51, a movable block 52 fixed to the base block 60 is combined with a stationary block 54 by a pair of leaf springs 53 which are slantly arranged in contact with the front and rear ends of the movable block 52 and the stationary block 54.

An electro-magnet 56 with a coil 55 is fixed to the stationary block 54, and it is facing to a movable core 52c extending downwards from the movable core 52, spacing a small gap.

In FIG. 8, a mounting plate S' is fixed to the right leaf spring 53 at the lower end by a bolt 53b. A spacer 53c is interposed between the right leaf spring 53 and the mounting plate S'. An amplitude sensor 53S of the eddy-current type is mounted on the upper end portion of the mounting plate S' which is close to the right leaf spring 53, and it detects the amplitude of the leaf spring 53, namely the return trough 61. A not-shown another control part is connected to the amplitude sensor 53S, and it is, in turn, connected to the coil 55 of the electro-magnet 56. The current flowing through the coil 55 is so controlled as to put the amplitude of the leaf spring 53 or the return trough 61 into another predetermined amplitude.

A vibration-absorbing block 57 is fixed to the stationary block 54 which is combined with a fixing block 59 by a pair of slant leaf springs 58. The vibration-absorbing block 57 and the leaf springs 58 constitute another vibration system of low resonant frequency for absorbing the vibration of the circulating linear parts feeder 1 to the common base 9. The fixing block 59 is fixed to the common base 9 by bolts 59b. The not-shown control part includes an inverter which is connected to the coil 55 of the electro-magnet 56. An alternating current of about 120 Hz is flowed through the coil 55. An alternating magnetic force occurs between the movable core 52c and the electro-magnet 56. The return trough 61 is linearly vibrated in the direction shown by the arrow j. The parts T are transported in the return trough 61 along the arrow n.

As shown in FIG. 5, the main trough 21 and the return trough 61 are facing to each other, spacing a very small gap 9. A single-row-layer forming device and a discharge guide 41 are exchangeably connected to the downstream end of the main trough 21. The transporting surface of the main trough 21 is formed by the sidewall 22, the one-row-layer forming device 31, a front-end surface 42s of the discharge guide 41 and an end sidewall 22e. The transporting surface of the return trough 61 is formed by the sidewall 62, and the emergency gate device 66 which is fitted to a cut out portion of the sidewall 22.

Figure 14:
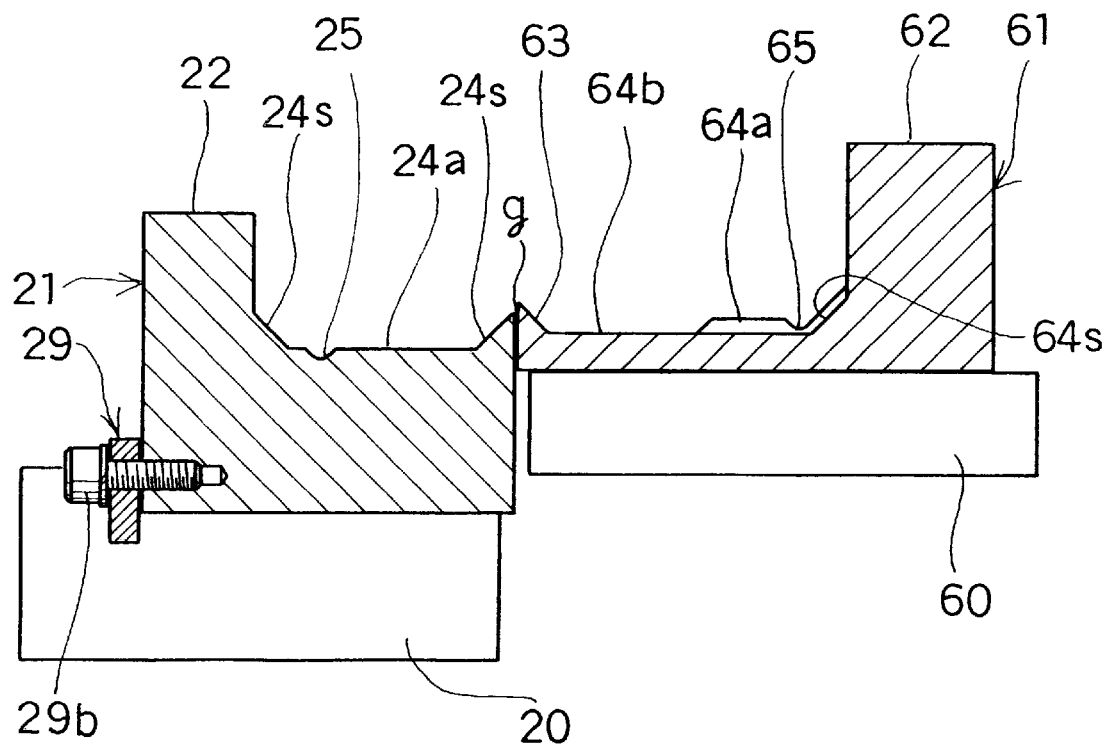
FIG. 14 is a cross section view taken along the line [14]—[14] in FIG. 5.
Figure 16:
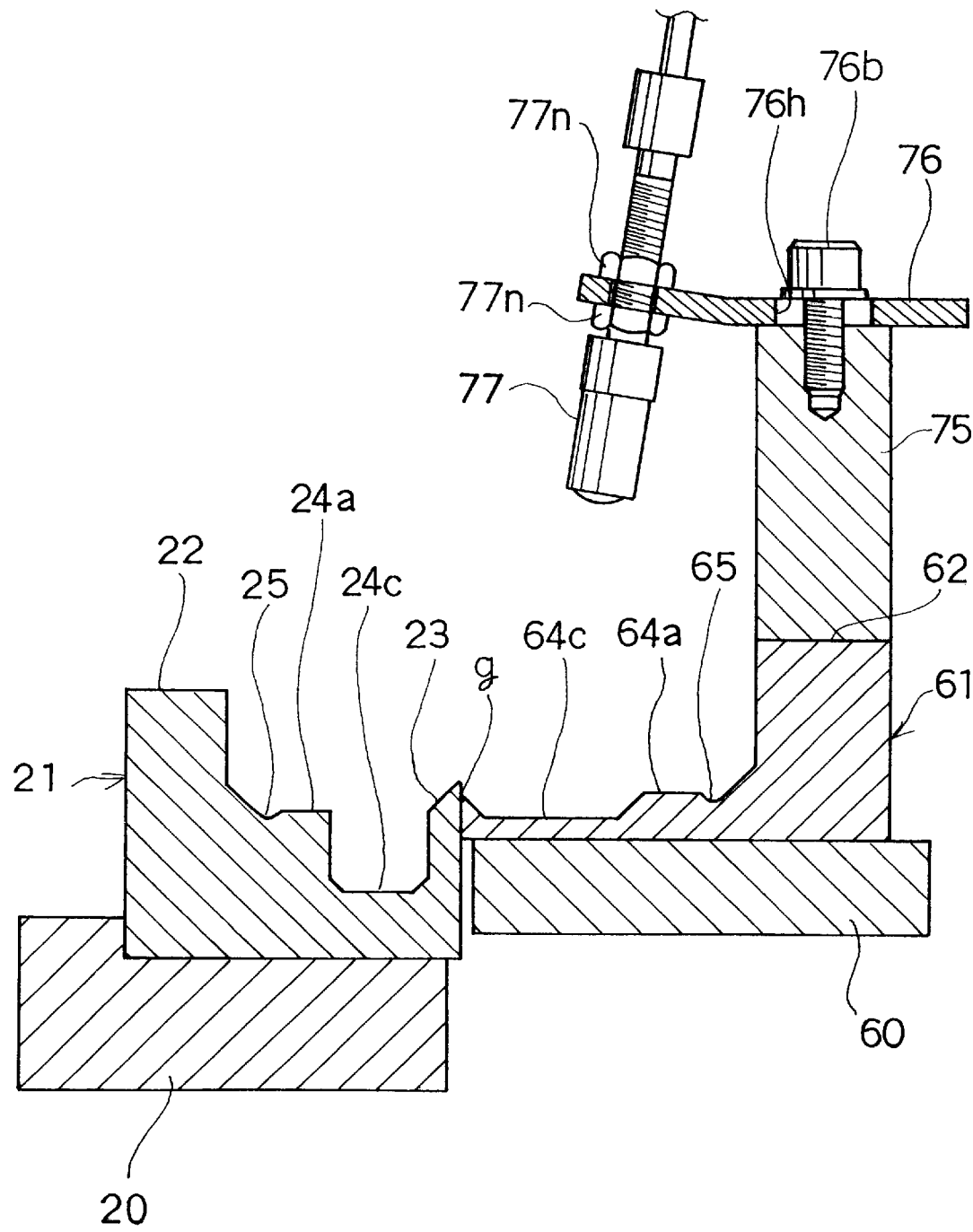
FIG. 16 is a cross section view taken along the line [16]—[16] in FIG. 5.

As shown in FIG. 16 which is the cross-sectional view taken along the line [16]—[16] in FIG. 5, a separator member 23 is formed on by the edge of the main trough 21 which is facing directly to the edge of the return trough 61, spacing the very small gap g. As shown in FIG. 14 which is a cross-sectional view taken along the line [14]—[14] in FIG. 5, another separator member 63 is formed on the edge of the return trough 61.

Figure 13:
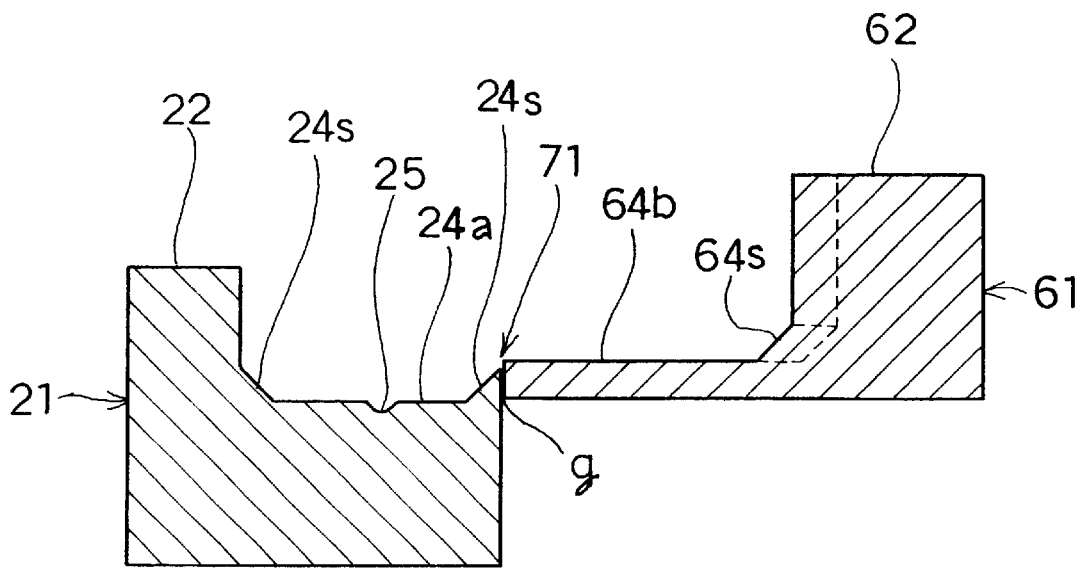
FIG. 13 is a cross section view taken along the line [13]—[13] in FIG. 5.

Transfer paths 71, 72, and 73 are formed between the separator members 23 and 63, and between the separator member 23 or 63 and the sidewall portions of the return trough 61 and the main trough 21, through which the parts T are transferred from the return trough 61 into the main trough 21 or from the main trough 21 into the return trough 61. The cross-sections of the transfer paths 71, 72, and 73 are shown in FIG. 13 which is a cross-sectional view taken along line [13]—[13], FIG. 15 which is a cross-sectional view taken along the line [15]—[15] in FIG. 5, and FIG. 21 which is a cross-sectional view taken along the line [21]—[21] in FIG. 5.

Figure 15:
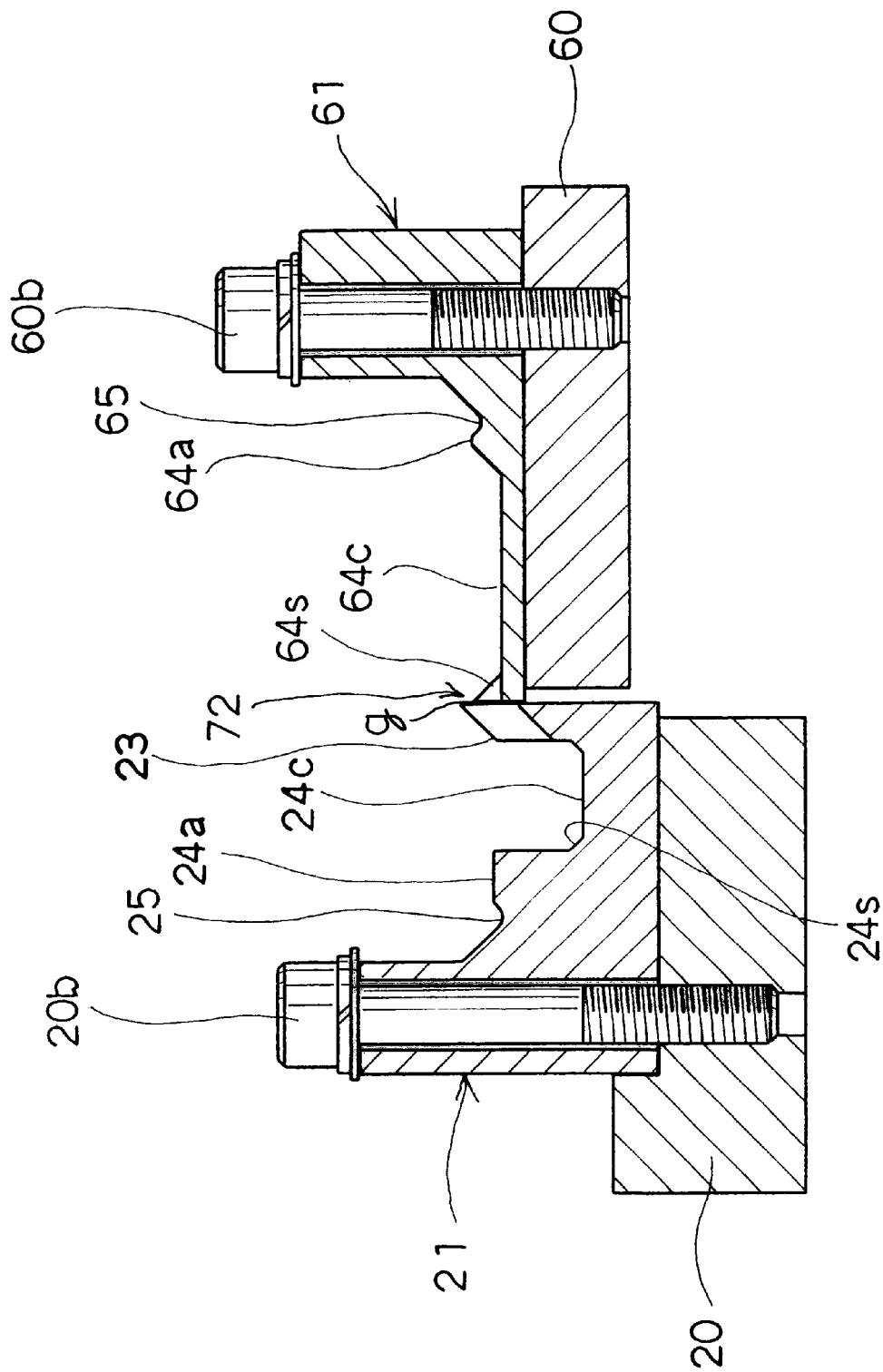
FIG. 15 is a cross section view taken along the line [15]—[15] in FIG. 5.

A transport surface 24a for orientating the parts T and an inward transport surface 24c for circulating the parts T are formed in the main trough 21. The transport surface 24c is lower by 6 mm than the transport surface 24a. Slant sidewalls 24s are formed at both sides of the transport surfaces 24a and 24c as shown in FIG. 13 and FIG. 15. The downstream end portion of the transport surface 24c is bent at the angle of 45°, and it communicates with the transfer path 73.

The width of the transport surface 24a is narrowed by the transport surface 24c as shown by FIG. 5. A guide groove 25 having the U-shaped cross-section is arcuately formed, extending from the transfer path 71 towards the downstream end of the transport surface 24a. The width of the guide groove 25 is 1 mm, and the depth thereof is 0.7 mm. The parts T are transported mainly along the guide groove 25 in the downstream portion of the transport surface 24a. An auxiliary groove 25u is formed between the guide groove 25 and the edge of the transport surface 24c. The parts T on the transport surface 24a which is shown in FIG. 15, are guided into the guide groove 25.

As shown in FIG. 5, an upstream-side transport surface 64a, a downstream-side transport surface 64b, and an inward transport surface 64c for circulating inwardly the parts T are formed in the return trough 61. The transport surface 64b is lower by 1 mm than the transport surface 64a, and the transport surface 64c is lower by 2 mm than the transport surface 64a.

Slant sidewalls 64s are formed at both sides of the transport surfaces 64a and 64c as shown in FIG. 14 and FIG. 15. A guide groove 65 having the U-shaped cross-section is arcuately formed, extending from the transfer path 73 towards the downstream end of the transport surface 64a. The width of the guide groove 65 is 1 mm, and the depth thereof is 0.7 mm. The parts T are transported mainly along the guide groove 25 in the middle portion of the transport surface 64a.

The downstream portion of the transport surface 64a is narrowed by the transport surface 64c, to form a narrow portion 64a'. Thus, the flow of the parts T to the downstream end is limited.

Figure 21:
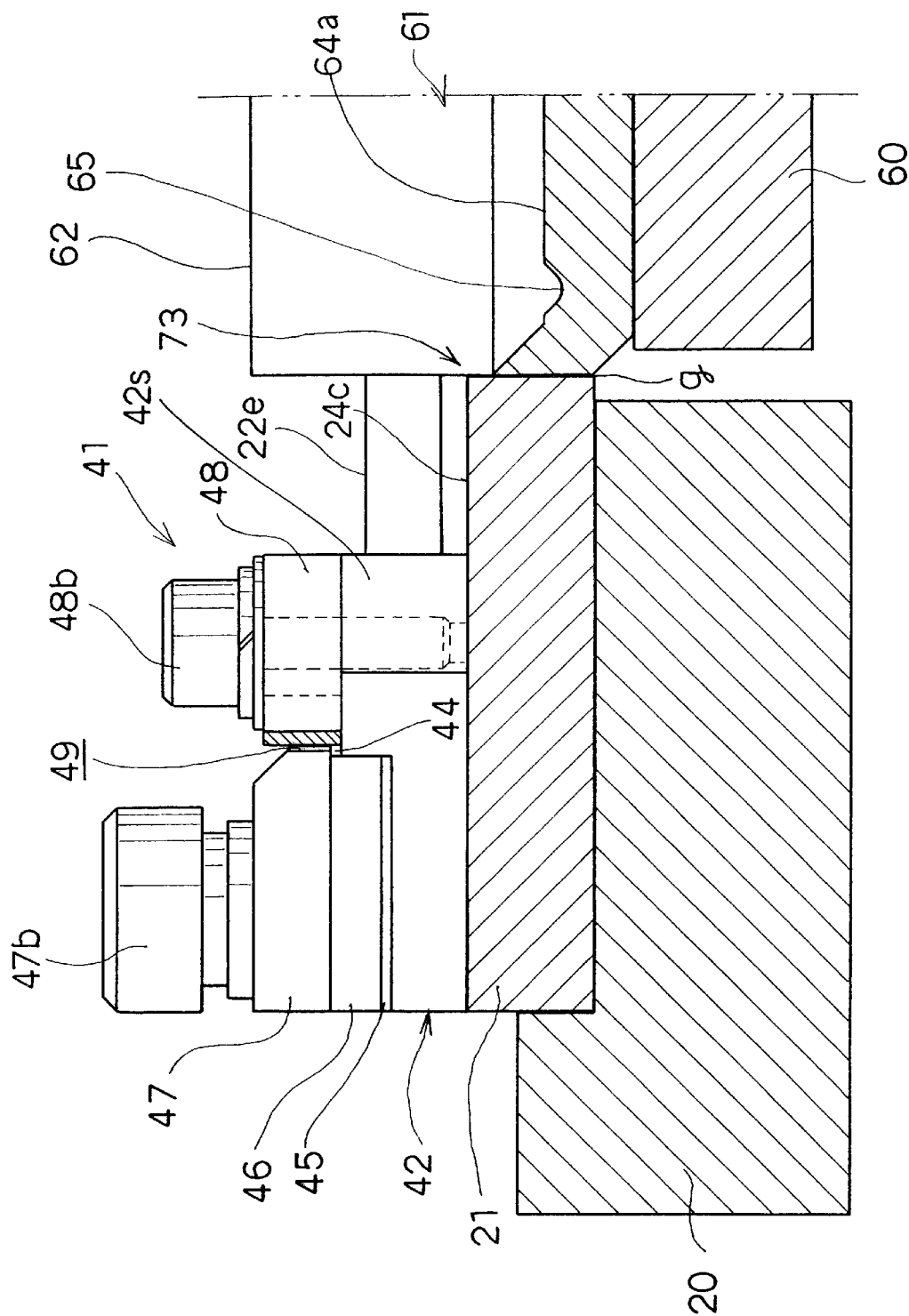
FIG. 21 is a partly broken-away side view taken along the line [21]—[21] in FIG. 5.

Referring to FIG. 13, the transporting surface 24a of the main trough 21 is lower by 2.5 mm than the transporting surface 64b of the return trough 61 at the transfer path 71. Referring to FIG. 15, the transporting surface 24c of the main trough 21 is lower by 2.5 mm than the transporting surface 64c of the return trough 61 at the transfer path 72. Referring to FIG. 21, the transporting surface 64a of the return trough 61 is lower by about 3 mm than the transporting surface 24c of the main trough 21 at the transfer path 73.

The parts T are circulated between the main trough 21 and the return trough 61, and a part of the parts T orientated are supplied through the discharge guide 41 to the next stage.

Figure 10:
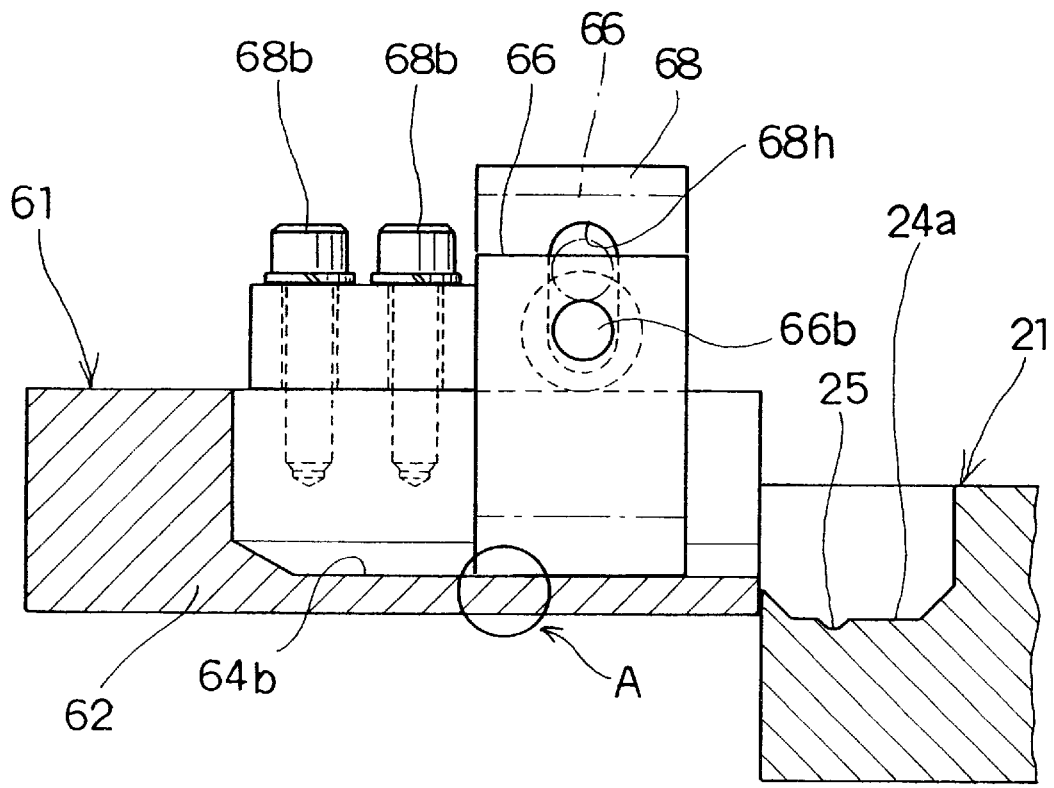
FIG. 10 is a cross section view taken along the line [10]—[10] in FIG. 5.
Figure 11:
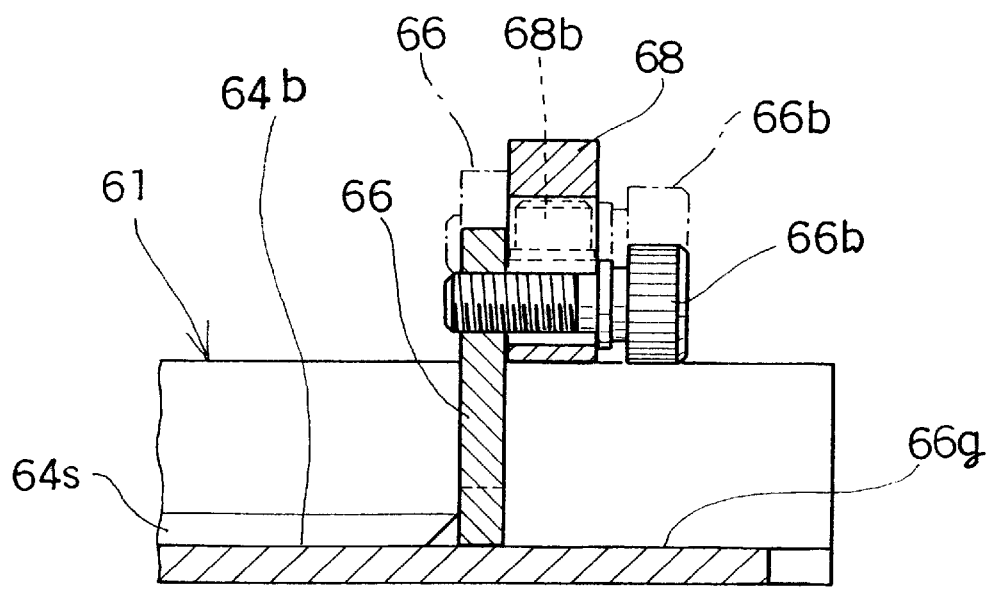
FIG. 11 is a cross section view taken along the line [11]—[11] in FIG. 5.
Figure 12:
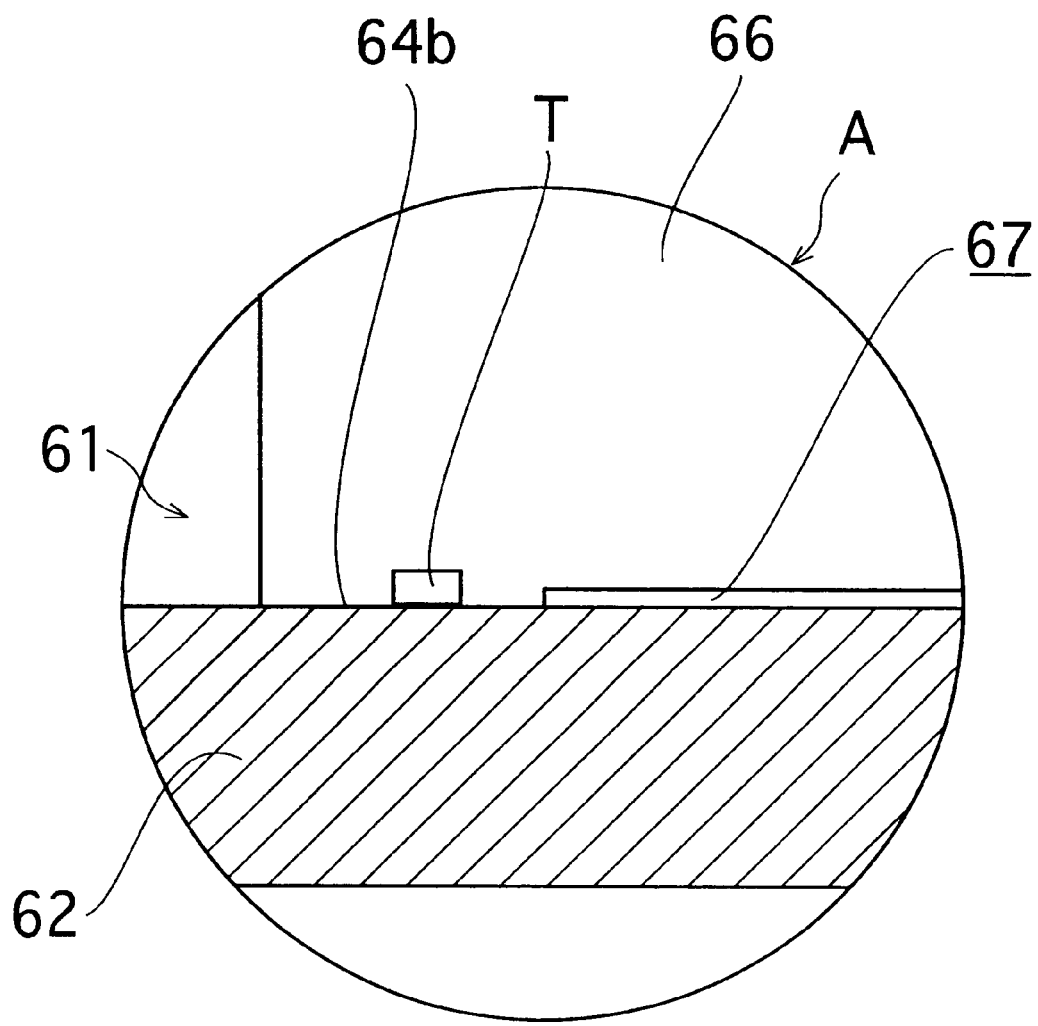
FIG. 12 is an enlarged view of a portion indicated by circle A in FIG. 10.

As shown in FIG. 5, an emergency gate device 66 is fitted to a cutout of the sidewall 62 of the return trough 61. FIG. 10 is a cross sectional view taken along the line [10]—[10] in FIG. 5, and shows a front view of the emergency gate device 66. FIG. 11 is a cross section taken along the line [11]—[11] in FIG. 5 and shows the cross section of the emergency gate device 66. The sidewall 62 is cut out to form a discharge path 66g. A fixing member 68 is fixed to the sidewall 62 by bolts 68b. The emergency gate device 66 is so fixed to the fixing member 68 as to be movably in the upward and downward directions, by bolts 66b. An oblong opening 68h is formed in the fixing member 68. The bolts 66b are inserted through the oblong opening 68h. When the parts T are discharged emergently outward from the linear feeder 1, the bolts 66b are loosened and the gate device 66 is upwardly slidden, as shown by the dot-dash line. When all of the parts T are requested to be discharged from the linear feeder 1 in the emergency such as when kind of the part is exchanged, and when the operation is ceased, the emergency gate device 66 is opened. It is normally closed. FIG. 12 is an enlarged view of the portion marked by a circle A in FIG. 10. A thin cut-off 67 is formed in the lower end of the emergency gate device 66. When it is positioned at the closed position, a slit is formed between the transporting surface 64b and the lower end. Small different particles or dust are passed through the slit 67 to the outward.

As shown by FIG. 16 which is a cross section taken along the line [16]—[16] in FIG. 5, a support post 75 is fixed on the sidewall 62 of the return trough 61, and a support plate 76 is fixed on the support post 75 by a bolt 76h which is inserted through an oblong opening 76h of the support plate 76. A photo-sensor 77 for detecting the part T is mounted on the top of the support plate 76 by nuts 77n. The position of the photo-sensor 77 can be adjusted in the upward and downward directions by loosing the nuts 77*n*. The parts T on the transport surface 64*c* can be monitored by the photo-sensor 77. The light from the photo-sensor 77 is reflected by the part T or transport surface 64*c*, and returns to the photo-sensor 77. The reflection rates of the parts T and transport surface 64c are different from each other. Thus, the existence of the parts T can be detected. When it is detected that the parts T become scarce, the parts T are supplied onto the transport surface 64*c* from a not-shown hopper storing parts T.

Figure 9:
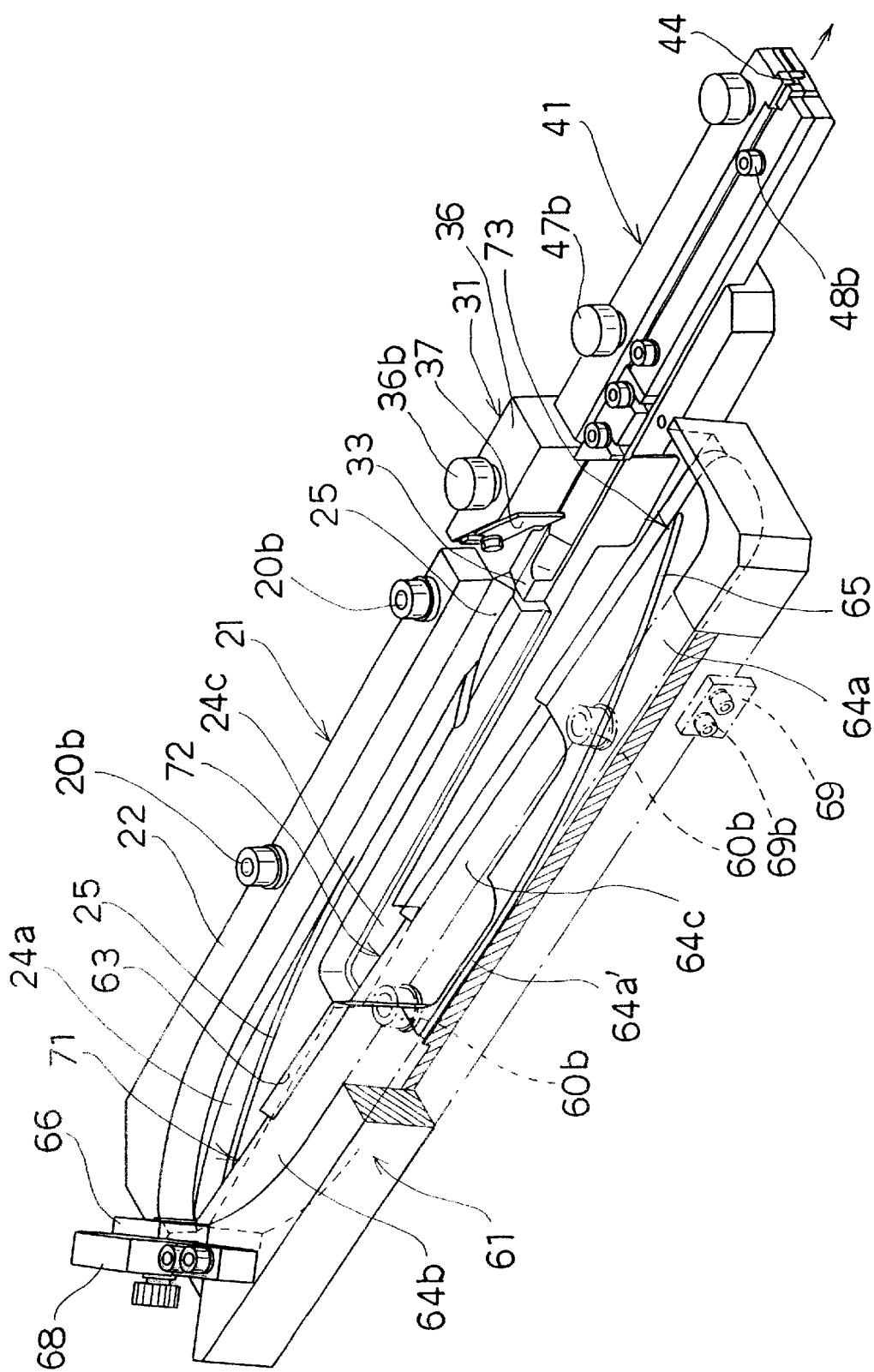
FIG. 9 is a perspective view of a main trough and return trough.
Figure 17:
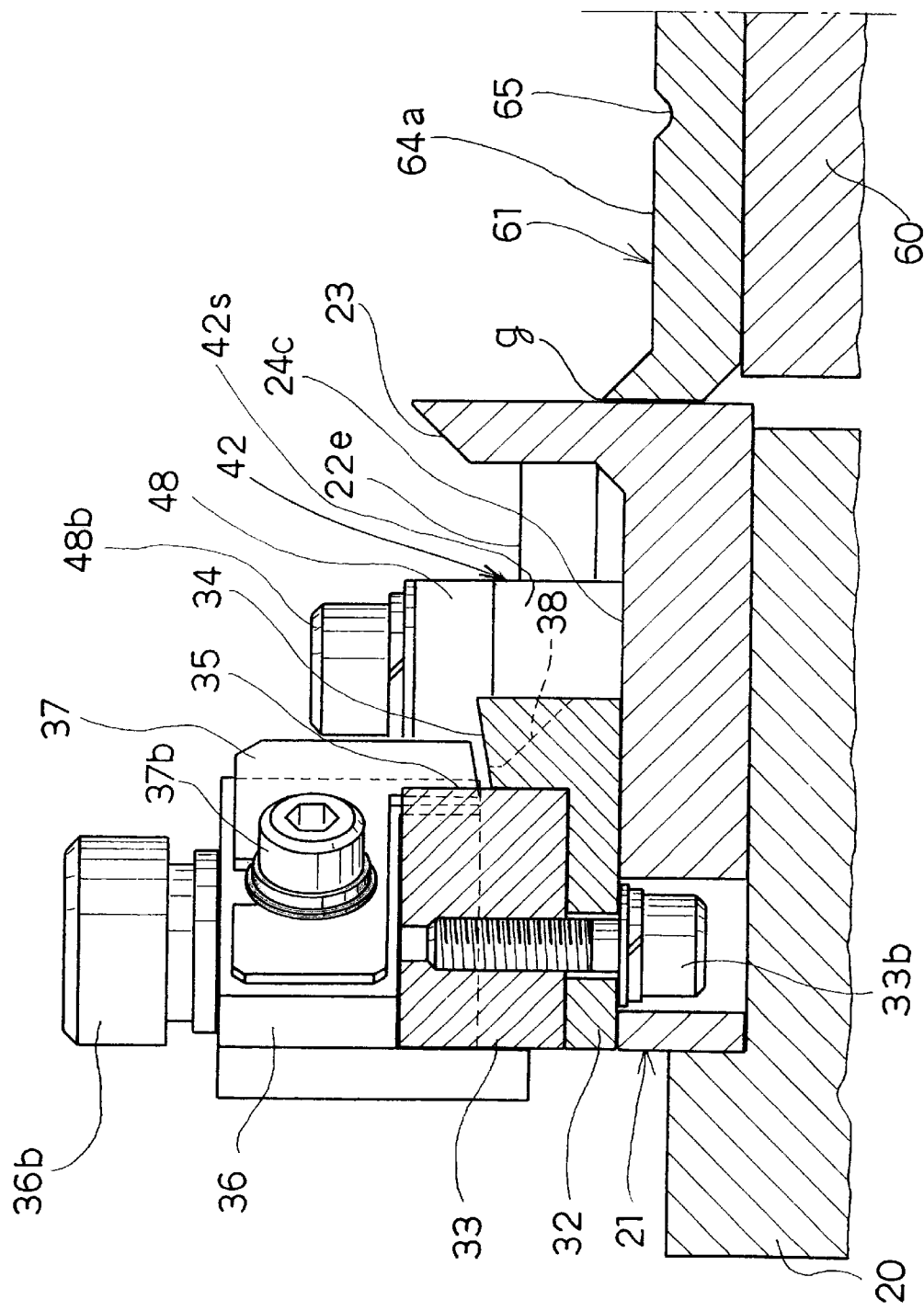
FIG. 17 is a cross section view taken along the line [17]—[17] in FIG. 5.
Figure 18:
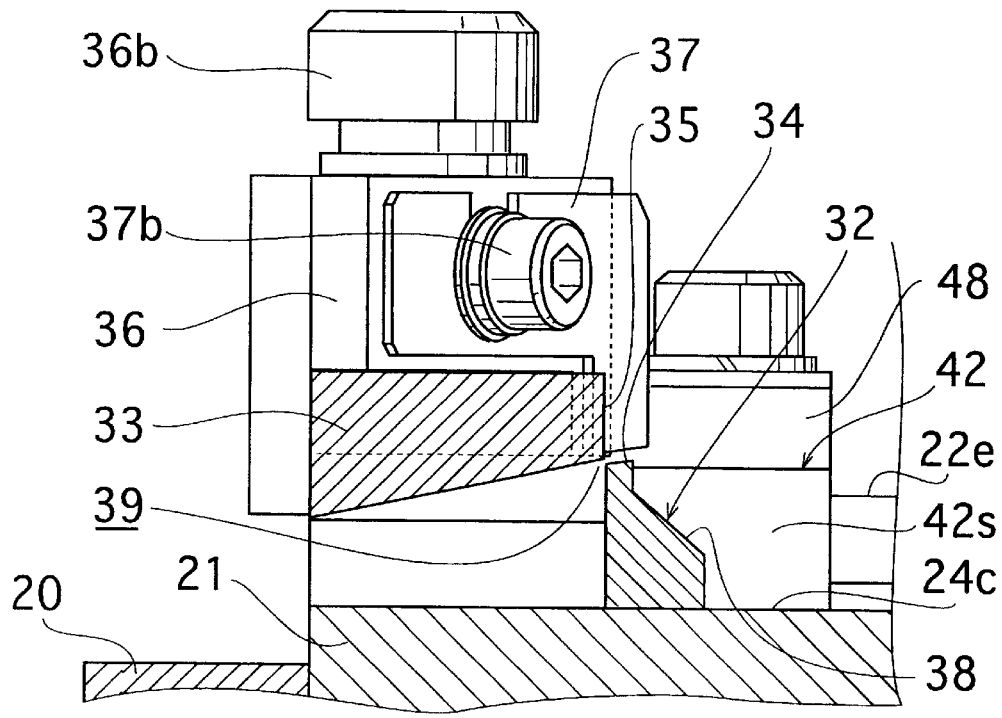
FIG. 18 is a cross section view taken along the line [18]—[18] in FIG. 5.
Figure 19:
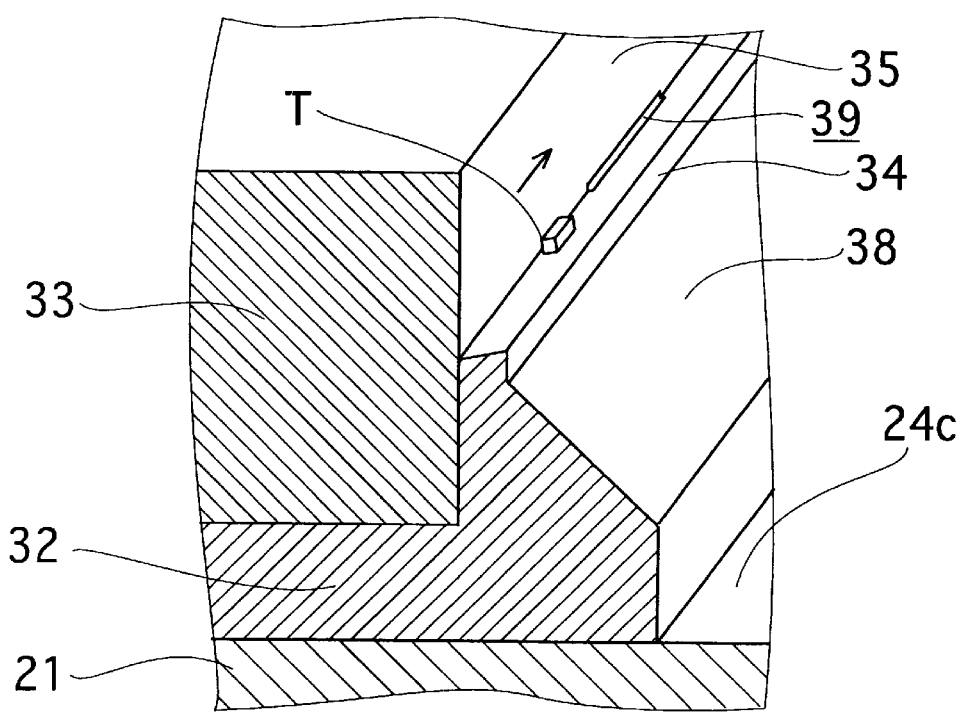
FIG. 19 is an enlarged perspective view of a portion in FIG. 18.
Figure 20:
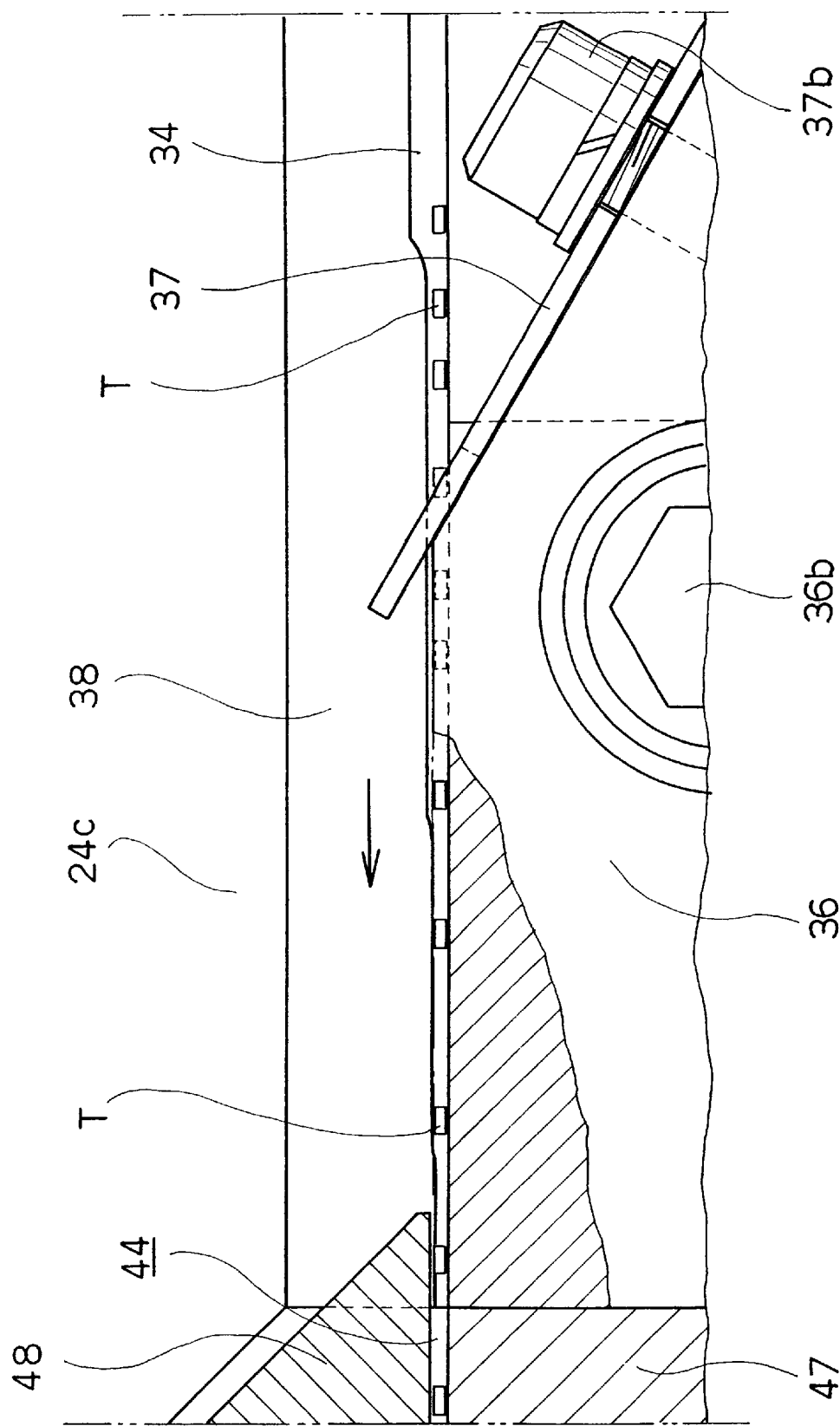
FIG. 20 is an enlarged plan view of portions related to the wiper blade.

As shown in FIG. 5 and FIG. 9, the one-row-layer forming device 31 is connected to the downstream end of the guide groove 25 of the main trough 21. As shown in FIG. 17 which is a cross section taken along the line [17]—[17] in FIG. 5, a track-forming member 32 and a sidewall-forming member 33 are exchangeably fixed to the main trough 21 by bolts 33*b*. The main trough 21 is, in turn, fixed to the base block 20. A track surface 34 having the width of 3.5 mm and outwardly inclined at the angle 10° and a vertical sidewall 35 are formed by combination of the track-forming member 32 and the sidewall-forming member 33. As shown in FIG. 5 and FIG. 20, the width of the track surface 34 is three-stepwise narrowed towards the downstream side. The largest width of the track surface 34 in the first step is 0.8 mm. As shown in FIG. 18 which is a cross section taken along the line [18]—[18] in FIG. 5, a slit hole 39 is formed in the sidewall 35 and the track surface 34, 0.1 mm high, 1 mm long, and 0.1 mm wide. Small particles or dust mixing with the parts T are removed through the slit-hole 39 to the outward. An enlarged perspective view of the slit hole 39 is shown in FIG. 19.

As shown in FIGS. 5, 17, and 18, a wiper blade 37 is fixed on a slant surface of a fixing member 36, by bolts 37*b*. The fixing member 36 is fixed to the sidewall-forming member 33 by bolts 36*b*. The spacing between the lower edge of the wiper blade 37 and the track surface 34 is about 0.4 mm, larger than the thickness t of the part T, but smaller than the double of the thickness t. Accordingly, the one layer and lying part T can pass under the wiper blade 37, but the piled lying parts T cannot pass under the wiper blade 37. The standing part T also cannot pass under the wiper blade 37. As clear from FIG. 20, the overlying part T and standing part T move along the side surface of the wiper blade 37, slide down on an inclined surface 38 and fall onto the transport surface 24*c*. The wiper blade 37 intersects slantly, in plan view, with the second-step portion of the track 34 which is 0.45 mm wide. Rows of the parts T are put into a single row of parts T at the second-step portion of the track 34. Outward rows of the parts T slide down on the inclined surface 38 and fall onto the transport surface 24*c*. The most downstream portion of the track 34 is about 0.3 mm wide. Only the parts T transported along its lengthwise direction can pass towards the outward.

Figure 22:
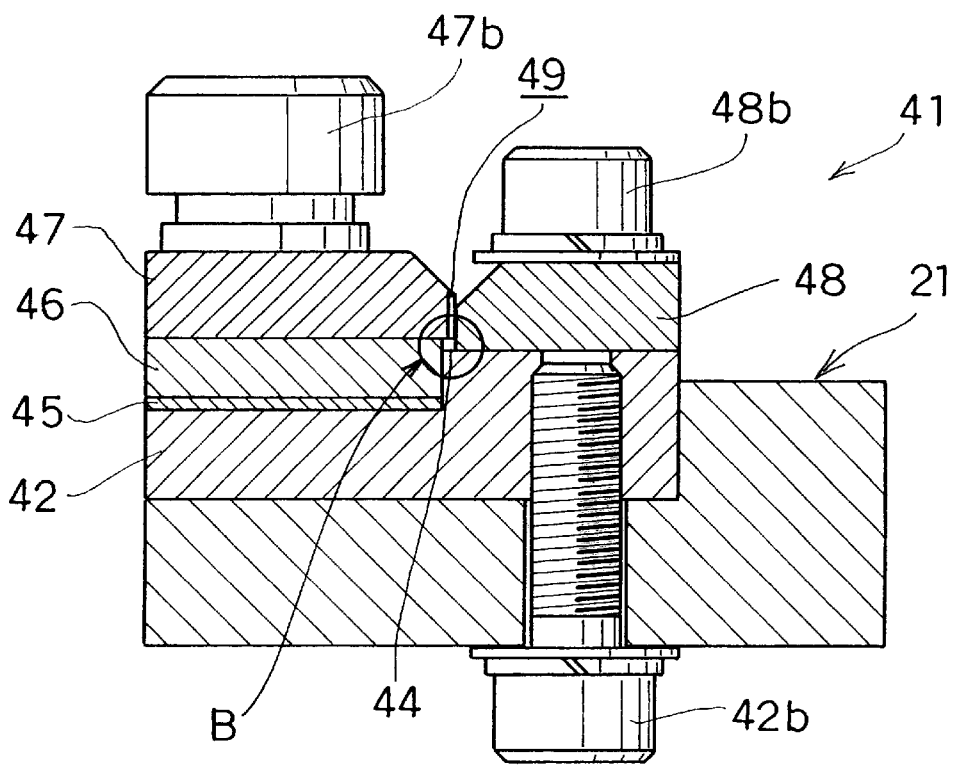
FIG. 22 is a cross section view taken along the line [22]—[22] in FIG. 5.
Figure 23:
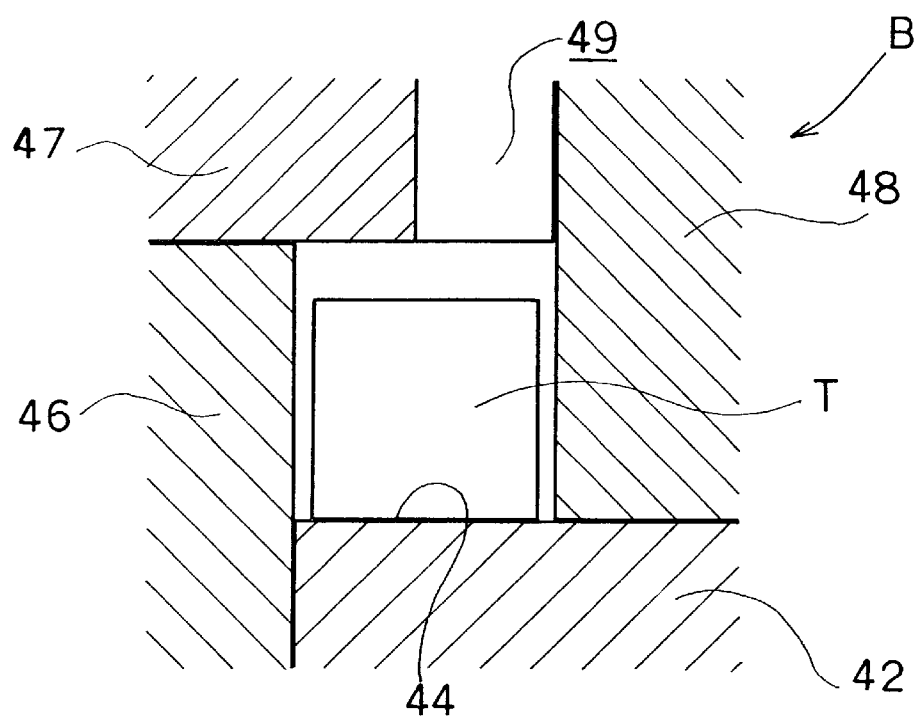
FIG. 23 is an enlarged view of portions shown by circle B in FIG. 22.

As shown in FIG. 5 and FIG. 9, the discharge guide 41 is connected to the one-row-layer forming device 31. FIG. 21 shows the upward end portion of the discharge guide 41. FIG. 22 shows a downstream portion of the discharge guide 41. FIG. 23 is an enlarged cross-sectional view of the discharge guide 44 marked by a circle B in FIG. 22. An L-shaped base plate 42 is exchangeably fixed to the main trough 21 by bolts 42*b*. A spacer 45, a transporting member 46, and another track-forming member 47 are fixed on the lower portion of the L-shaped base plate 42 by bolts 47*b*.

A further track-forming member 48 is fixed on the higher portion of the L-shaped base plate 42 by bolts 48*b*, spacing a little gap 49 from the track-forming member 47. The discharge guide track 44 is formed in the shape of tunnel, in the center of the members 42, 46, 47, and 48 as clearly shown in FIG. 23. The track-forming members 47 and 48 are so cut V-shaped as to shorten the depth of the gap 49. Thus, the parts T in the discharge guide track 44 can be observed from the above.

The circulating vibratory linear parts-feeder 1 according to the first embodiment of this invention has been described as the above. Next, its operation will be described.

The main linear feeder 10 and the return linear feeder 50 are so designed that their resonant frequencies are about 300 Hz and 120 Hz, respectively. Before they are operated for transporting the parts T, the amplitudes of the main trough 21 and return trough 61 are observed with the variation of the drive frequencies of the inverters and their actual resonant frequencies are obtained. They are near 300 Hz and 120 Hz, respectively. The drive frequencies of the inverters for the main linear feeder and the return linear feeder are fixed to the obtained resonant frequencies or near them. Accordingly, the main linear feeder 10 and the return linear feeder 50 are driven accurately at the resonant frequencies or near them during the operations, respectively.

It is assumed that the main trough 21 and the return trough 61 contain a considerable amount of the parts T in FIG. 5, 6, and 7. A current of high frequency of about 300 Hz from the inverter is supplied to the coil of the drive part 11. The main trough 21 is linearly vibrated in the direction as shown by the arrow h. The parts T are transported in the main trough 21, in the direction as shown by the arrow m.

Similarly, another current of low frequency of about 120 Hz from the other inverter is supplied to the coil of the drive part 51. The return trough 61 is linearly vibrated in the direction as shown by the arrow j. The parts T are transported in the return trough 61, in the arrow shown by the arrow n. The amplitude sensors 13*s* and 53*s* facing to the leaf springs 13, 53 of the drive parts 11, 51 are operative. The photo-sensor 77 mounted on the return trough 61 is operative.

In this embodiment, the amplitudes of the main trough 21 and the return trough 61 are 0.1 to 0.2 mm, and 0.25 to 0.35 mm, respectively. The angle of the vibration to the horizon is 10° respectively.

In FIG. 5, the parts T are transported in the transport surface 64*a* of the return trough 61, in the direction as shown by the arrow n. Some of them are led into the guide groove 65, and the others fall down into the transport surface 64*c* or transported on the transport surface 64*a*. The flow amount of the parts T is limited by the narrowed portion 64*a*' of the transport surface 64, and then they fall down onto the transport surface 64*b*, and are generally transported along the curved sidewall 62. The smaller particles or dusts are passed through the small slit 67 as shown in FIG. 12, and removed to the outward. The parts T are transported into the transport surface 24*a* of the main trough 21 from the downstream end of the return trough 61 through the transfer path 71.

A part of the parts T transferred from the return trough 61 into the upstream end of the main trough 21, fall down into the transport surface 24*c*, while almost of them are led into the guide groove 25, and they are transported to the end of the guide groove 25. They are supplied to the one-row-layer forming device 31 connected to the end of the guide groove 25. The parts T transported on the portion of the transport surface 24*a* between the guide groove 25 and the transport surface 24*c* fall down into the transport surface 24*c*, or led into the auxiliary groove 25*u* and into the guide groove 25. In the one-row-layer forming device 31, the track 34 is inclined downwards to the outward, and so the parts T are transported in contact with the sidewall 35, to be positioned with respect to the width of the parts T, as shown in FIG. 17. The smaller particles or dusts mixed with the parts T are passed through the small slit 39, as shown in FIG. 18 and FIG. 19, to the outward.

The parts T reach the wiper blade 37 as clearly shown in FIG. 18 and FIG. 20 and some of them which are overlying or standing, are removed by the wiper blade 37 to the side of the return trough 61 through the inclined surface 38, and fall down onto the transport surface 24c. Accordingly, the overlying parts T are led out from the wiper blade 37. As shown in FIG. 10, the track 34 is further narrowed to the width of about 0.3 mm at the downstream side of the wiper blade 37. The parts T transported in the direction of the width, are fallen down from the track 34 onto the transport surface 24c through the inclined surface 38.

Accordingly, only the parts T in the predetermined posture are supplied to the next stage, one by one. The transported parts T can be observed from the above through the gap 49.

Referring again to FIG. 5, the parts T fallen down into the transport surface 64c from the upstream portion of the transport surface 64a and fallen down from the narrowed portion 64a' of the transport surface 64, are joined with each other in the transport surface 64c. They are led through the transfer path 72 into the transport surface 24c of the main trough 21. And they are transported along the arrow m. The parts T fallen down from the transport surface 24a and the parts T rejected from the one-row-layer forming device 31 are joined with each other, and led to the upstream end portion of the transport surface 64a of the return trough 61 through the transfer path 73, guided by the front end surface 42s of the discharge guide 41 and the side wall 22e.

The parts T are transported through the transport surfaces 64a and 64b and the transfer path 71 into the transport surface 24a of the main trough 21, and some of them are led into the guide groove 25 and reach the one-row-layer forming device 31. The parts T passing through the one-row-layer forming device 31 are supplied through the discharge guide 41 to the outward and the parts T fallen down onto the transport surface 24c are led through the transfer path 73 into the transport surface 64a of the return trough 61. Thus, the dual circuit systems are formed by the outward path of transport surface 64a of the return trough 61→transfer path 71→transport surface 24a of the main trough 21→guide groove 25 transport surface 24c of the main trough 21→transfer path 73→transport surface 64a of the return trough 61, and the inward path of the transport path 64a of the return trough 61→transport path 64c transfer path 72 transport surface 24c of the main trough 21 transfer path 73 transport surface 64a of the return trough 61.

In the outward circuit path, the feed rate of the parts T is generally limited by the narrowed portion 64a' of the transport surface 64a, and then transferred into the main trough 21. The amplitude of the main trough 21 is so controlled at the frequency of about 300 Hz that the predetermined supply rate of the parts T guided by the groove 25 is obtained from the discharge guide 41. And the amplitude of the return trough 61 is so controlled at the frequency of about 120 Hz that the amount of the parts T for compensating the output of the discharge guide 41 is transferred from the return trough 61 into the transport surface 24a of the main trough 21. The arcuate guide groove 25 functions to gather the parts T from the transport surface 24a, in the main trough 21. The parts T can be almost continuously discharged out from the discharge guide 41.

In the inward circuit path, the parts T are transported from the transport surface 64c of the return trough 61 into the transport surface 24c of the main trough 21 through the transfer path 72. And they are returned to the transport surface 64a of the return trough 61 through the transfer path 73. Almost of them are returned into the transport surface 64c of the return trough 61. The parts T are transported at the lower speed in the return trough 61. The transport surface 64c is lower than the transport surface 64a in the return trough 61. The most of the parts T are gathered in the transport surface 64c. The transport surface 64c functions as a pool of the parts T. The existence of the parts T on the transport surface 64c is detected by the photo-sensor 88. When it detects the parts T being scarce, the parts T are supplied onto the transport surface 64c from the not-shown hopper.

When a relatively small amount of the parts T remains in the return trough 61, the guide groove 65 functions to gather the parts therein from the transport surface 64a. Accordingly, the parts T can be continuously transferred from the transport surface 64b into the upstream end portion of the main trough 21 even when the parts T remain a little. The parts T can be continuously circulated between the main trough 21 and the return trough 61, keeping a good balance. The parts T can be stably and continuously supplied from the discharge guide 41 to the next stage at the predetermined feed rate.

According to this embodiment, the main trough 21 can be exchanged with another main trough, for example, when the parts T are exchanged with another parts different in kind and size, or when the one-row-layer forming device 31 is exchanged with another one-row-layer forming device or any ordering means.

Figure 24:
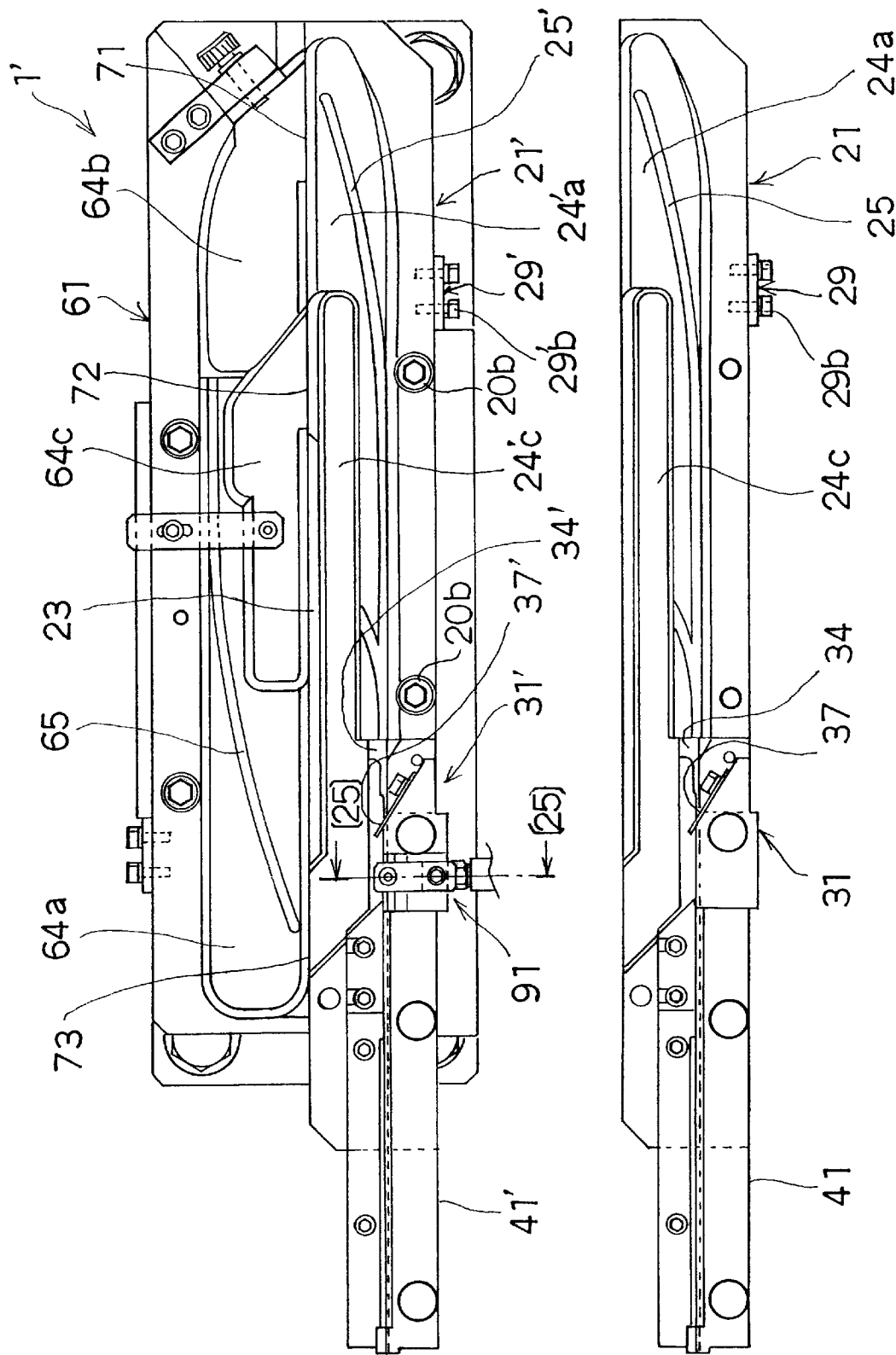
FIG. 24 is a plan view of another main trough exchanged with the main trough and return trough in the circulating vibratory linear parts-feeder of the first embodiment.

In FIG. 24, the main trough 21 is exchanged with another main trough 21'. The bolts 20b are loosened and the stopper 29 is removed from the base block 20. The return trough 61 remains. The new main trough 21' is positioned relatively to the base block 20 by a stopper 29'. FIG. 24 is a plan view of a circulating vibratory linear parts-feeder 1' comprising of the return trough 61 and the main trough 21'. The main trough 21' is different from the main trough 21 in the point that the former includes a surface detector 91 for a part T' arranged at the downstream side of the one-raw-layer forming device 31. The former is equal to the latter in the other points. Dashes (') are affixed to the reference numerals of the constituent elements corresponding to the constituent elements of the circulating vibratory linear parts-feeder 1. The part T' is a "tip resistor" small as the part T. And a black carbon-resistor film is formed on one surface of the part T'. In the desired posture of the part T', the black film is facing upwards.

Figure 25:
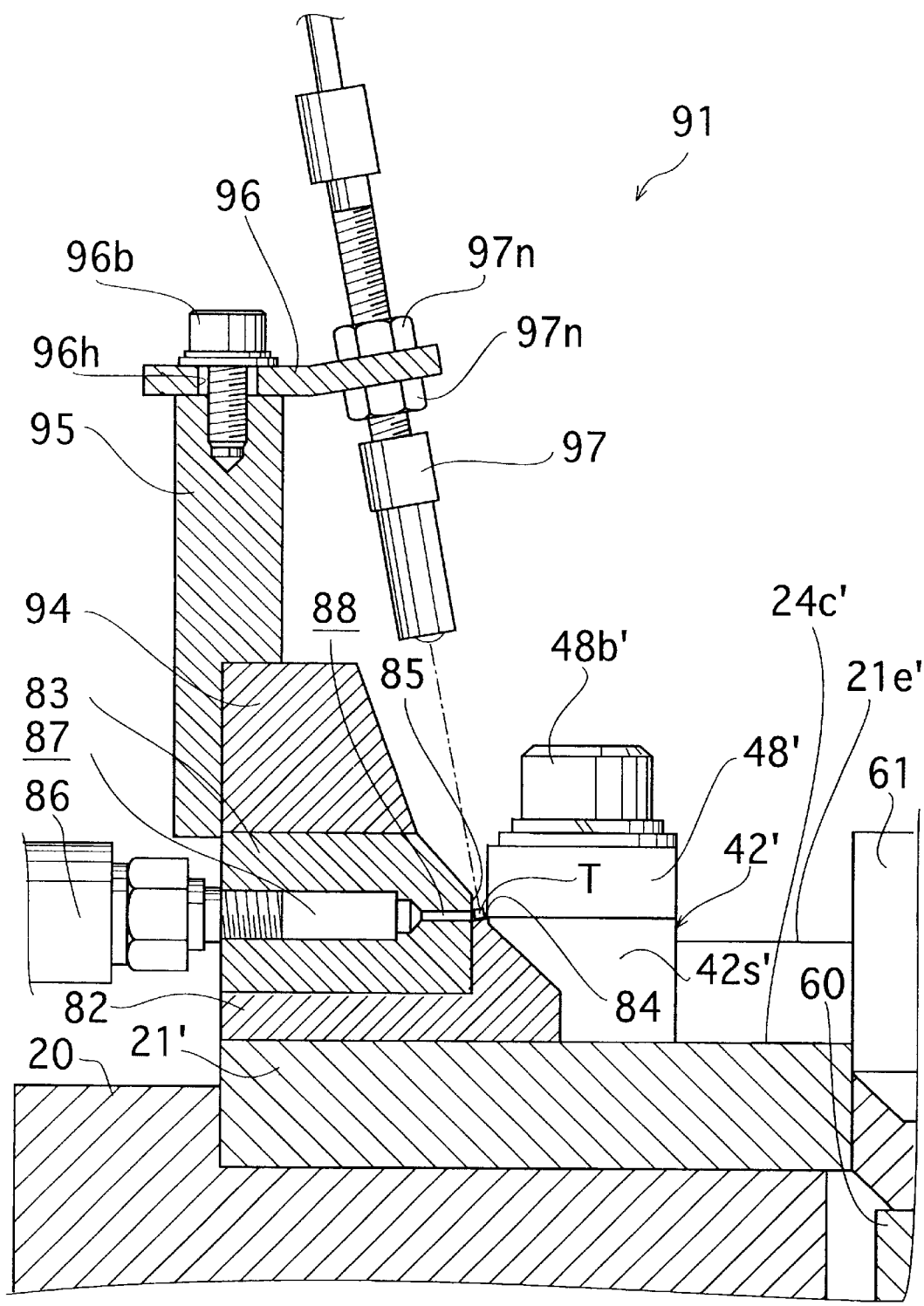
FIG. 25 is a cross section view taken along the line [25]—[25] in FIG. 24.

Referring to FIG. 25 which is a cross-sectional view taken along the line [25]—[25] in FIG. 24, the main trough 21', a track-forming member 82 and a sidewall-forming member 83 are combined with each other by not-shown bolts. The main trough 21' is fixed to the base block 20. A track 84 inclined downwardly and outwardly at the angle of 100, and a vertical sidewall 85 are made with the combination of the track-forming member 82 and sidewall forming member 83. A coupling for a compressed air conduct 86 is screwed to a horizontal air hole 87 made in the sidewall member 83. A nozzle opening 88 is made in communication with the horizontal air hole 87, and it is facing to the part T transported on the track 84.

A support post 95 is fixed on a fixing member 94 fixed to the sidewall-forming member 83. A support plate 96 is fixed to the support post 95 by a bolt 96b. It is inserted through an oblong opening 96h made in the support plate 96. A surface photo-detector 99 is fixed to the top end of the support plate 96 by nuts 97n so as to be adjustable in the upward and downward directions. The light from the photo-detector 97 is incident on the black film of the part T', other surfaces of the part T' or the track surface 84. The strengths of the reflective light from them are different from each other. Thus, the part T' in which the black film is facing upwardly, is detected. The strength of the reflective light from the black film is lowest. When it is detected, the ejection of the compressed air from the air nozzle 88 is instantaneously stopped, the part T' in the desired posture is passed under the surface detection 91. The parts T' in the other postures are blown away by the air jet from the air nozzle 88, and they are fallen down onto the transport surface 24c'.

Next, there will be described a circulating vibratory linear parts-feeder according to a second embodiment, with reference to FIG. 26. It is different from the circulating vibratory linear parts-feeder 1 of the first embodiment in a one-row-layer forming device 101. The former is equal to the latter in the other constituent elements. Accordingly, only the one-row-layer forming device 101 will be described.

Figure 26:
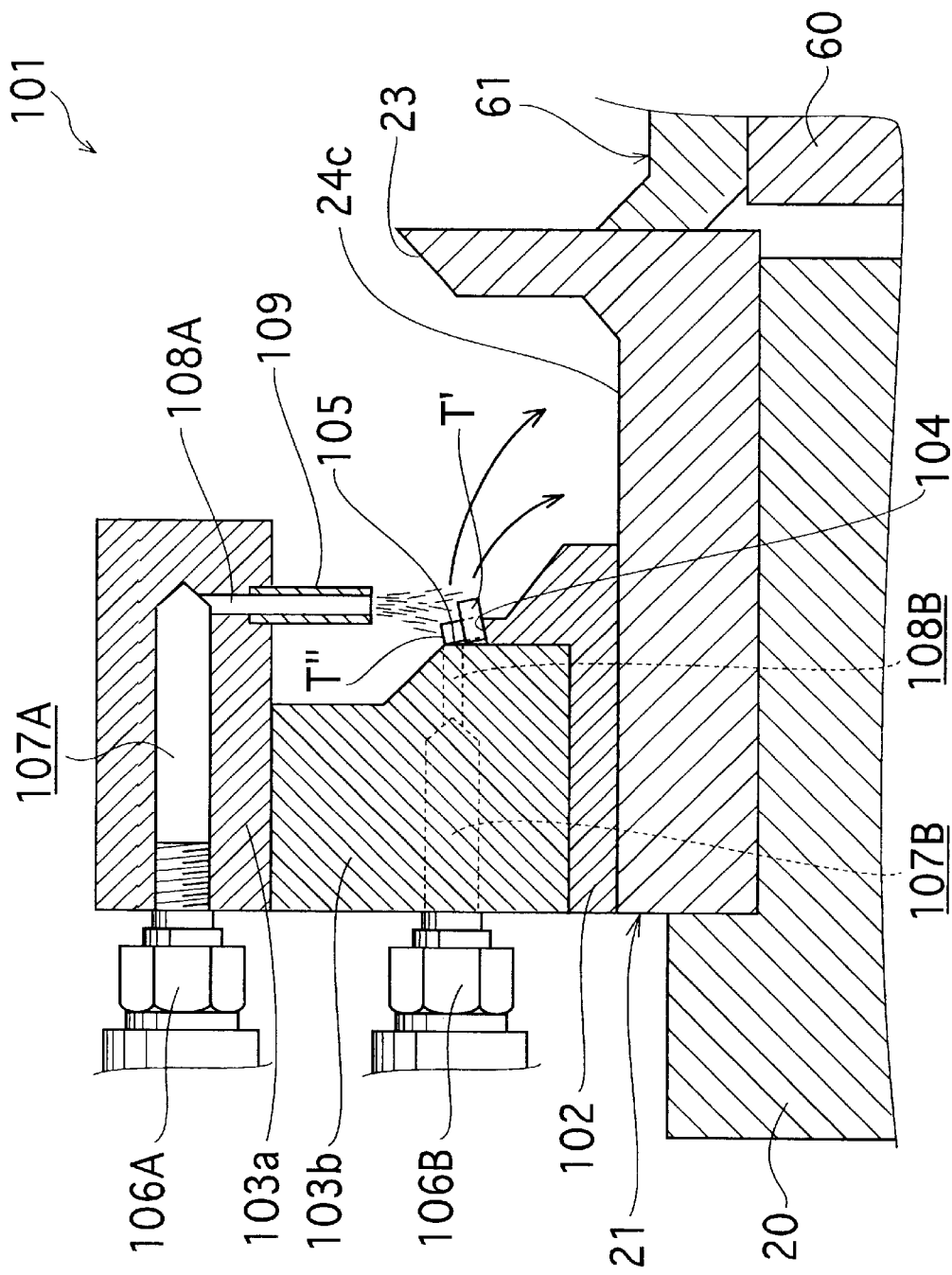
FIG. 26 is a cross section view of an orientating device attached to the circulating vibratory linear parts-feeder according to a second embodiment of this invention.

In FIG. 26, a track-forming member 102 and sidewall-forming members 103a and 103b are fixed to the main trough 21 by not-shown bolts which is, in turn, fixed to the base block 20.

A track 104 inclined downwardly and outwardly at the angle 10°, and a vertical sidewall 105 are made with the combination of the track-forming member 102 and sidewall-forming member 103b. A coupling for a compressed air conduct 106A is screwed to a horizontal hole 107A made in the sidewall member 103a. A nozzle opening 108A is made in communication with the horizontal air hole 107A, and it is facing to the part T' transported on the track 104. A horizontal air hole 107B is formed in the sidewall member 103b. A coupling for compressed air conduct 106B is screwed into the air hole 107B. A nozzle opening 108B is made in communication with the air hole 107B. A nozzle 109 is screwed to the downward nozzle opening 108A.

The width of the track 104 is so small that only the single row of the parts T' can be transported. The coupling for the compressed air conduct 106A is higher than that for the compressed air conduct 106B. The former is positioned little downstream relative to the latter. The nozzle opening 108B is so high that the standing parts T''' is blown away onto the transport surface 24c. The parts T' can be transported in its lengthwise direction and in one row and one layer by the one-row-layer forming device 101. Further, the air ejected from the nozzle opening 108B and nozzle 109 functions as air curtain which prevents dust or small particles from invading into the tunnel-like discharge guide track 44. It can be avoided by such air curtain that the parts are jammed in the tunnel-like discharge guide track 44 due to the small particles or dust.

FIG. 27 is a plan view of a circulating vibratory linear parts-feeder 3 according to a third embodiment of this invention.

Similarly to the first embodiment, a main trough 221 of a main linear feeder 210 and a return trough 261 of a return linear feeder 250 are facing to each other, spacing very small gap g from each other. The parts T are transported in the direction shown by the arrow p, in the main trough 221. They are transported in the direction shown by the arrow q, in the return trough 261. The main trough 221 is horizontally arranged. A one-row-layer forming device 231 and a discharge guide 241 are connected to the main trough 221. The return trough 261 is slantly and upwardly arranged at the angle 5° with respect to the transport direction. The parts T are circulated in the anti-clock direction, between the main trough 221 and the return trough 261.

Further, they are different from the first embodiment in transport surface construction. The drive part of the main linear feeder 210 generates a drive force of high frequency such as 250 Hz, while the drive part of the return linear feeder 250 generates a drive force of low frequency such as 100 Hz. The amplitudes of the main trough 221 and return trough 261 are independently controlled. Transport surfaces of the main trough 221 are formed by a sidewall 222, the orientating device 231, a front end 242s of a discharge guide 241 and an end sidewall 222e, while transport surfaces of the return trough 261 are formed by a sidewall 262 and an emergency gate device 266. A separate member 263 is formed on the edge of the return trough 261, facing to the edge of the main trough 221. Transfer paths 271 and 272 are formed at both sides of the separator member 263. The downstream end of the transfer path 271 overhangs little the main trough 221, and the downstream end of the transfer path 272 overhangs a little the return trough 261.

In the main trough 221, transport surfaces 224a, 224b, and 224c are formed. The transport surface 224b is lower than the transport surface 224a, and the transport surface 224c is lower than the transport surface 224b. The downstream end portion of the transport surface 224c is bent towards the return trough 261 at the angle of 45°, and it communicate with the transfer path 272. The slant sidewalls 224s are formed on the edges of the transport surfaces 224a and 224b. The transport surface 224a is narrowed in the middle portion and downstream end portion, by the transport surface 224b. A guide groove 225a is arcuately formed in the transport surface 224a. It has an U-shaped cross section, extending from the entrance portion of the transport surface 224a to the exit end portion thereof. The parts T are transported mainly in the guide groove 225a at the downstream side of the transport surface 224a.

A short guide groove 225b is angularly connected to the guide groove 225 at point 226, extending outwardly. A one-row-layer forming device 231 and a discharge guide 241 are connected to the end of the guide groove 225b. A slant surface 227 inclined downwardly toward the transport surface 224b is connected to the guide groove 225b. A track 34 under the one-row-layer forming device 231 is so narrowed as to transport the parts in one row and in one layer. The overlying parts and the standing parts are removed away by the wiper blade 237.

One transport surface 264 is formed in the return truck 261. A slant wall 264s is formed between a sidewall 262 and the transport surface 263. An emergency gate device 266 is fitted to a cutout made in the downstream side of the sidewall 262. It is equal to the device 66 in construction, and so its description will be omitted.

In the transfer path 271, the transport surface 224a of the main trough 221 is lower than that 264 of the return trough 261. In the transfer path 272, the transport surface 264 of the return trough 261 is lower than that 224c of the main trough 221.

The circulating vibratory linear parts-feeder 3 has been described as above. Next, its operation will be described.

It is assumed that the main trough 221 and return trough 261 contain a considerable amount of parts T. The main trough is linearly vibrated at the frequency of about 250 Hz to transport the parts in the direction shown by the arrow p.

The return trough 261 is linearly vibrated at the frequency of about 100 Hz to transport the parts T in the direction shown by the arrow q. The amplitudes of the main trough 221 and return trough 261 are independently controlled to predetermined values.

The parts T are arcuately guided by the end portion of the sidewall 262, and passes by the emergency gate device 266. And they are transferred through the transfer path 271 into the upstream end of the transport surface 224a of the main trough 221. They are transported in the direction shown by the arrow p, and partially led into the guide groove 225d. The other parts T run over the guide groove 225a into the transport surfaces 224a, 224b, and 224c.

The parts T are transported in the guide grooves 225a and 225b through the point 226 and they are led into the track 234 of the one-row-layer forming device 231. When the parts T are transported suitably spaced from each other in the guide groove 225a, they are smoothly flowed through the point 226 into the downstream side guide groove 225b. However, when they overflow in the guide groove 225a, or they are pushed by each other in the guide groove 225a, some of them are removed towards the slant surface 227 and fallen down onto the transport surface 224b. Accordingly, they are always smoothly and continuously led into the one-row-layer forming device 231 and discharge guide 241. The parts removed by the wiper blade 237 are fallen down onto the transport surface 224c. The parts T flowing in the transport surfaces 224b and 224c are joined with the parts T falling onto the transport surface 224b from the point 226 between the guide grooves 225a and 225b. Further, they are joined with the parts fallen down onto the transport surface 224c from the wiper blade 237. They are guided along the end surface 242s and the end surface of the member 222e, toward the return trough 261.

In the main trough 221, some of the parts T are transported from the transport surface 224a into the guide groove 225a, the point 226, the guide groove 225b, and the one-row-layer forming device 231. The parts T transported on the transport surfaces 224b and 224c are led into the return trough 261. The circulating vibratory linear parts-feeder 3 has dual circuit systems. One of them consists of the transport surface 264 of the return trough 261, the transport surface 224a, the guide groove 225a, 225b, the transport surface 224c, and the transport surfaces 264 of the return trough 261.

Another of them consists of the transport surface 264 of the return trough 261, the transport surfaces 224a, 224b, the transport surface 224c, and the transport surface 264 of the return trough 261. The transport surface 264 of the return trough 261 is common in the dual circuit systems.

In the main trough 221, the transport surface 224a is narrowed at the downstream side by the transport surface 224b. The parts T are transported only in the guide groove 225a. Thus, the flow amount to the discharge guide 241 is limited to a suitable value. The other parts T are transported in the transport surfaces 224b and 224c. The amplitude of the main trough 221 is so controlled to the predetermined value at the frequency of about 250 Hz that orientated parts T are supplied from the discharge guide 241 at the predetermined rate. The amplitude of the return trough 261 is so controlled to the other predetermined value at the frequency of about 100 Hz that a sufficient and suitable amount of the parts T to compensate the flow amount of the guide groove 225a is transferred to the main trough 221, keeping a good balance between the return trough 261 and main trough 221 although the return trough 261 contains further more parts as the storage. The parts T can be continuously and stably supplied to the outward from the discharge guide 241, at the predetermined rate.

While the preferred embodiments have been described, variations thereto will occur to those skilled in the art within the scope of the present inventive concepts which are delineated by the following claims.

The vibration frequencies of the main trough and return trough are about 300 Hz and about 120 Hz, in the first embodiment, respectively, and about 250 Hz and about 100 Hz in the second embodiment respectively. They may be other frequencies without limiting to the above frequencies. They may be so different from each other that the vibration of the main trough and that of the return trough do not interfere with each other, although the main linear feeder and the return linear feeder are vibrated near the respective resonant frequencies.

In the above embodiments, the drive parts are the electromagnet with coil. However, any drive part of other types may be used. For example, such a drive part may be used that piezo-electric elements are attached to leaf springs 13 and 53, and alternating voltages of different frequencies are applied to the leaf springs 13 and 15 in the main linear feeder and the return linear feeder.

Further, the amplitude detector is of the eddy current type in the above embodiments. However, any amplitude detector of other type, for example, that of the electrostatic capacity type may be used instead.

Further in the above embodiments, the amplitude sensor 13s is arranged close to the slant leaf springs 13 and 53. They may be arranged close to any other vibratory constituent part, or attached to it.

In the above embodiments, the cross sections of the guide grooves 25 and 65 are U-shaped. They may be in another shape. For example, they may be V-shaped, trapezoidal or rectangular in accordance with a shape of part to be transported in one row.

Further in the above embodiments, the guide groove 25 or 65 is one in the main trough and the return trough. Plural grooves may be formed in the return trough. Plural guide grooves may be formed in the upstream side and they may be joined with each other in the middle streamside.

What is claimed is:

1. In a circulating vibratory linear parts feeder including;
   (a) a main trough for transporting parts in one direction; and
   (b) a return trough for transporting the parts in the opposite direction to said one direction and arranged closely to said main trough and spaced therefrom with a small gap whereby said parts are transferred from a downstream end of said return trough into an upstream end of said main trough, orienting means in said main trough for orientating parts therein and for discharging the oriented parts from a discharge end to the outside and for returning other parts from a downstream end of said main trough into an upstream end of said return trough whereby said parts are being continuously circulated in the main trough and return trough, the improvements comprising said main trough including a transport surface for orientating said parts and an inward circulating surface being lower than said transport surface;

said return trough including a circulating surface;

said main trough and said return trough having respective vibratory drives of different frequencies; and means for transferring said other parts from a downstream end of said return trough to an upstream end of said transport surface of said main trough;

a discharge guide connected to the end of said main trough for discharging the oriented parts; and means for transferring the parts being led into said inward circulating surface into said circulating surface of said return trough.

2. A circulating vibratory linear parts-feeder according to claim 1, in which said circulating surface of the return trough consists of an outward circulating surface portion and an inward circulating surface portion being lower than said outward circulating surface portion whereby the parts transferred from the downstream end of the main trough are distributed to said outward circulating surface portion and said inward circulating surface portion;

means for discharging the parts oriented in the transport surface of the main trough through the discharge guide to the outside and for transferring the other parts which are not orientated in the transport surface of the main trough and the parts being led into said inward circulating surface of the main trough into an upper stream end of the outward circulating surface portion of the return trough, whereby some of the parts are transported to the downstream end of said return trough and the others are led into the inward circulating surface portion and transferred into the inward circulating surface of the main trough.

3. A circulating vibratory linear parts-feeder according to claim 1, in which an arcuate guide groove is provided in the transport surface of the main trough whereby the parts are distributed into the arcuate groove and the inward circulating surface, single-row-layer forming means for positioning the parts into a single row and layer and connected to the end of said guide groove, and whereby parts which have fallen down from said guide groove and rejected by the single-row-layer forming means are led into the upstream end of the return trough together with the parts flowed on the inward circulating surface.

4. A circulating vibratory linear parts-feeder according to claim 3, in which said circulating surface of the return trough consists of an outward circulating surface portion and an inward circulating surface portion which is lower than said outward circulating surface portion whereby the parts are transferred from the downstream end of the return trough into the upstream end of the main trough and are distributed to said transport surface and said inward circulating surface, and the parts orientated in the transport surface are discharged through the discharge guide to the outside and the parts which are not oriented in the transport surface and the parts being led into said inward circulating surface are transferred into the upper stream end of the outward circulating surface portion, and some of the parts are transported to the downstream end and the others are led into the inward circulating surface portion and transferred into the inward circulating surface of the main trough.

5. A circulating vibratory linear parts-feeder according to claim 1, in which said main trough is vibrated by one drive of high frequency and said return trough is vibrated by another drive of low frequency.

6. A circulating vibratory linear parts-feeder according to claim 1, in which vibratory amplitudes of said main trough and return trough are independently controlled to predetermined values respectively.

7. A circulating vibratory linear parts-feeder according to claim 6, in which amplitude detectors are arranged close to leaf springs for said main trough and return trough respectively.

8. A circulating vibratory linear parts-feeder according to claim 1, in which said main trough is exchangeable with another main trough in accordance with a kind or size of parts or the desired posture of the parts.

9. A circulating vibratory linear parts-feeder according to claim 1, in which said return trough is upwardly inclined with respect to the transport direction such that the upstream end of said return trough is lower than the downstream end of said main trough, and the downstream end of said return trough is higher than the upstream end of said main trough.

10. A circulating vibratory linear parts-feeder according to claim 1, in which a photo-sensor for detecting the existence of parts on said circulating transport surface transport surface or inward circulating surface portion is arranged above said return trough.

11. A circulating vibratory linear parts-feeder according to claim 2, in which said outward circulating transport surface portion is narrowed by increasing the width of said inward circulating transport portion where the flow amount of parts transferred from the downstream end of said outward circulating transport surface portion into the upstream end of said main trough is limited suitably.

12. A circulating vibratory linear parts-feeder according to claim 2, including a guide groove in said outward circulating transport surface portion.

13. A circulating vibratory linear parts-feeder according to claim 3, in which an auxiliary groove is connected to said guide groove for gathering the parts therein from the transport surface in said main trough.

14. A circulating vibratory linear parts-feeder according to claim 3, in which said guide groove is angularly bent at its downstream side toward the outside in said main trough.

15. A circulating vibratory linear parts-feeder according to claim 1, in which an emergency gate device is arranged in said return trough for rapidly discharging the parts to the outside.

16. A circulating vibratory linear parts-feeder according to claim 15, including a small cutout in the lower end of said emergency gate device for eliminating small particles or dust to the outside.

17. A circulating vibratory linear parts-feeder according to claim 3, in which said single-row-layer forming means is exchangeably connected to the end of said guide groove.

18. A circulating vibratory linear parts-feeder according to claim 1, in which said single-row-layer forming means comprises a sufficiently narrowed track to pass parts lengthwise in one row, and a wiper blade to eliminate overlying and standing parts.

19. A circulating vibratory linear parts-feeder according to claim 1, in which said single-row-layer forming means comprises a narrowed track, a vertical air-jet means and a horizontal air-jet means.

20. A circulating vibratory linear pats-feeder according to claim 19, including a small slit in said narrowed track and a sidewall for eliminating dust and small particles.

21. A circulating vibratory linear parts-feeder according to claim 20, in which said discharge guide has a tunnel-like track for passing parts in one row and one layer.

22. A circulating vibratory linear parts-feeder according to claim 21, including a slit in said discharge guide for observing the parts form above.

23. A circulating vibratory linear parts-feeder according to claim 1, in which said main trough is exchangeable with another main trough, when parts to be transported are altered or said orientating means is altered, without altering said return trough.

24. A circulating vibratory liner parts-feeder according to claim 1, in which at least one of the drive frequencies and the drive amplitudes of said main trough and return trough are independently adjustable.

* * * * *